United States Patent [19]

Niskanen et al.

[11] Patent Number: 5,566,451
[45] Date of Patent: Oct. 22, 1996

[54] METHOD FOR PROVIDING A ROLL MANTLE OF A TUBULAR ROLL FOR A PAPER MACHINE OR EQUIVALENT WITH ROLL BEARINGS

[75] Inventors: Juhani Niskanen, Oulunsalo; Pekka Kivioja, Muurame; Juha Lahtinen; Esa Lensu, both of Jyväskylä; Esa Salavamaki, Muurame, all of Finland

[73] Assignee: Valmet Corporation, Helsinki, Finland

[21] Appl. No.: 437,503

[22] Filed: May 9, 1995

Related U.S. Application Data

[62] Division of Ser. No. 236,644, May 2, 1994, Pat. No. 5,509,883.

[30] Foreign Application Priority Data

Mar. 9, 1994 [FI] Finland .................... 941107

[51] Int. Cl.$^6$ .................................................. B23P 15/00
[52] U.S. Cl. .............. 29/895.3; 492/5; 492/7; 492/20
[58] Field of Search .............. 29/895.3; 492/2, 492/5, 6, 7, 20; 72/243, 245; 100/35, 162 B, 170

[56] References Cited

U.S. PATENT DOCUMENTS

| | | | |
|---|---|---|---|
| 4,625,637 | 12/1986 | Pav et al. | 100/47 |
| 4,651,547 | 3/1987 | Morel et al. | 72/8 |
| 4,793,250 | 12/1988 | Niskanen | 100/35 |
| 4,864,703 | 9/1989 | Biondetti et al. | 492/7 |
| 5,060,357 | 10/1991 | Roerig et al. | 29/113.2 |
| 5,063,649 | 11/1991 | Wenzel et al. | 29/116.1 |
| 5,111,563 | 3/1992 | Brown et al. | 29/116.2 |
| 5,286,245 | 2/1994 | Schiel | 492/20 |

FOREIGN PATENT DOCUMENTS

| | | |
|---|---|---|
| 0332594 | 12/1993 | European Pat. Off. |
| 76870 | 11/1985 | Finland . |
| 74070 | 8/1987 | Finland . |
| 925761 | 12/1992 | Finland . |
| 3941965 | 5/1990 | Germany . |
| 810204852 | 6/1983 | Japan . |
| 472590 | 5/1969 | Switzerland . |
| 2036252 | 6/1980 | United Kingdom . |
| 2049516 | 12/1980 | United Kingdom . |
| 8803611 | 5/1988 | WIPO . |

*Primary Examiner*—Irene Cuda
*Attorney, Agent, or Firm*—Steinberg, Raskin & Davidson, P.C.

[57] ABSTRACT

A method for providing a tubular roll mantle of a roll for a paper machine or equivalent with glide bearings and a roll including glide-bearings. The roll mantle is supported on a stationary roll axle by hydraulic glide-bearing members acting upon the roll mantle or upon the roll ends. The bearing members are loaded hydraulically by a pressure medium. The roll mantle is supported on the roll axle by at least one pair of glide-bearing members which acting radially and/or axially in opposite directions. When an outside force that shifts or attempts to shift the roll mantle in the direction transverse to the main loading direction and/or in the axial direction is applied to the roll mantle, the pressure in the glide-bearing member placed at the side of the higher loading is adjusted to a level higher than the pressure in the glide-bearing member acting in the opposite direction so that the outside forces are neutralized. In another embodiment, the roll mantle is permitted to be shifted over a certain distance in the main loading direction. When the roll mantle approaches its preset extreme position in this direction, the movement of the roll mantle is brake down, and finally the movement is stopped in its extreme position by the glide-bearing members.

20 Claims, 16 Drawing Sheets

METHOD FOR PROVIDING A ROLL MANTLE OF A TUBULAR ROLL FOR A PAPER MACHINE OR EQUIVALENT WITH ROLL BEARINGS

This is a division of U.S. patent application Ser. No. 08/236,644, filed May 2, 1994, now U.S. Pat. No. 5,509,883.

BACKGROUND OF THE INVENTION

The present invention relates to a method for fitting a tubular roll mantle of a roll intended for a paper machine or equivalent with glide bearings, in which the roll mantle is supported on a stationary roll axle by means of hydraulic glide-bearing members acting upon the roll mantle or upon the roll ends. The bearing members are hydraulically loaded by the effective pressure applied by of a pressure medium.

Further, the invention relates to a method for fitting a tubular roll mantle of a roll intended for a paper machine or equivalent with glide bearings, in which the roll mantle is supported on a stationary roll axle by hydraulic glide-bearing members acting upon the roll mantle or upon the roll ends. The bearing members are hydraulically loaded by means of a pressure medium, while the roll is loaded radially in the direction of at least one plane, i.e., in the so-called main loading direction.

Further, the invention relates to a tubular roll that makes use of the method for a paper machine or equivalent. The roll mantle of the roll is revolvingly supported on a stationary roll axle by means of glide-bearing members that act upon the inner face of the roll mantle and/or upon the roll ends. The glide-bearing members are loaded by means of the effective pressure of a hydraulic pressure medium.

The invention also relates to a tubular roll that makes use of the method in accordance with the invention for a paper machine or equivalent. The roll mantle of the roll is revolvingly supported on a stationary roll axle by means of glide-bearing members that act upon the inner face of the roll mantle and/or upon the roll ends. The glide-bearing members are loaded by means of the pressure of a hydraulic pressure medium, while the roll is loaded radially in the direction of at least one plane, i.e., in the so-called main loading direction.

Tubular rolls in paper machines are ordinarily mounted or journalled on the roll axle at the ends of the roll mantle by means of roller bearings. Such a conventional mode of journalling has its advantages, for example, the fact that the journalling can be accomplished quite simply, and so far its costs have been considered to be relatively moderate. However, this conventional mode of journalling, in which the roll mantle is journalled on the axle permanently by its ends, is not suitable for all objects of use in paper machines. In quite a number of cases, the roll mantle must be able to move radially in relation to the roll axle, which characteristic is quite often required, e.g., for variable-crown rolls which are in nip contact with a back-up roll. By means of the crown variation means in a variable-crown roll, attempts are made to shape the roll mantle in the desired way especially in view of regulation of the profile of linear load. Therefore, the roll ends must also be able to move in the radial direction in relation to the axle in order that the profile of linear load could be controlled in the end areas of the roll. In addition to the profile-regulation properties in the end areas of the roll, the regulation of the loading in the end areas of the roll also affects the control of the temperatures in the end areas of the roll.

For this reason, such rolls have been developed in which the entire roll mantle can move in the direction of loading radially in relation to the roll axle. One roll of this type is described in the assignee's EP Patent No. 0 332 594. In the roll described in this reference, the end bearings of the variable-crown roll are not mounted directly on the central axle of the roll. Rather, the bearings are arranged on separate annular parts which can move radially in relation to the roll axle. The variable-crown roll in accordance with this reference is a nip roll, and the radial movement of the roll mantle is confined to the direction of the nip plane. The movement is accomplished so that hydraulic power units are arranged between the annular parts and the roll axle. The power units shift the end bearings by means of a hydraulic pressure medium toward the nip or away from the nip. The principal object of the device in EP '594 of this solution is to open and close the nip. There is also a large number of other rolls of similar type, which produce a substantially corresponding action accomplished by means of a somewhat different technique.

The fitting of a roll with roller bearings also produces considerable drawbacks and/or problems for the manufacture and operation of the roll. It is one particular drawback that the roller bearings require certain machining of the roll mantle. The wear of the bearings may also result in problems and, further, the roller bearings impose their restrictions in respect of the oil or fluid to be used in the roll. For example, the following properties can be considered as the weak points of the conventional mode of journalling.

Restrictions of speed: Even at present, the speeds of rotation of the rolls exceed the maximum permitted speeds specified by bearing manufacturers.

Precision of rolling: With the present technology, it is very difficult to increase the rolling precision of an assembled roll further. In a traditional roll, even if all the components (bearings, bearing spaces, outer face of mantle) are machined as precisely as possible,.the defects are summed up in an assembled roll.

Fitting of a roll mantle with glide bearings is also known in the prior art. One such roll with glide bearings is described in U.S. Pat. No. 5,111,563. By means of the device shown in this reference, the object has been to provide a roll which automatically corrects and compensates for the loading of the roll. However, a significant drawback of this device is its highly complicated construction, as a result of which the controllability of the operation is not as good as possible.

OBJECTS AND SUMMARY OF THE INVENTION

Accordingly, it is an object of the present invention to provide a tubular roll of a novel type and fitted with glide bearings for a paper machine or equivalent.

It is another object of the present invention to provide a new and improved roll by means of which the drawbacks related to the prior art are substantially avoided and by means of which roll, at the same time, a substantial improvement is achieved over existing constructions and over the controllability of existing rolls.

It is another object of the present invention to provide a new and improved device and method for neutralizing or counteracting external forces applied to a roll mantle.

In view of achieving these objects, and others, in a first embodiment of the method in accordance with the present invention, the roll mantle is supported on the roll axle by means of glide-bearing members acting radially and/or axially in opposite directions, so that, when an outside force that shifts or attempts to shift the roll mantle is applied to the roll mantle, the pressure in the glide-bearing member placed at the side of the higher loading is adjusted to a level higher than the pressure in the glide-bearing member acting in the opposite direction. In this manner, the outside forces are substantially neutralized and counteracted.

In a second embodiment of the method in accordance with the invention, the roll mantle is supported on the roll axle by means of glide-bearing members acting radially in opposite directions in the main loading direction, so that the roll mantle is allowed to be shifted over a certain distance in the main loading direction. In this case, when the roll mantle approaches a preset extreme position in this direction, the movement of the roll mantle is braked down and finally the movement is stopped in its extreme position by means of the glide-bearing members, i.e., by applying pressure via the pressure medium therein.

In a first embodiment of the roll that makes use of the method of the invention, the roll mantle of the roll is supported on the roll axle by means of glide-bearing members loaded radially and/or axially in opposite directions. The glide-bearing members communicate with a regulation device, or with a corresponding regulation valve, which is arranged to distribute the pressure via the flow of the pressure medium in the glide-bearing members acting in opposite directions so that the force components of the forces applied to the roll mantle from outside, i.e., external forces, that are directed in a direction parallel to the directions of action of the glide-bearing members are substantially neutralized, i.e., counteracted.

In a second embodiment of the roll that makes use of the method of the invention, the roll mantle of the roll is supported on the roll axle by means of glide-bearing members that are loaded radially in opposite directions in the main loading direction. The glide-bearing members communicate with a regulation device, or with a corresponding regulation valve, which is arranged to distribute the pressure via the flow of the pressure medium in the glide-bearing members acting in opposite directions so that a certain preset maximum movement or shifting is permitted for the roll mantle. In this case, when the roll mantle approaches its extreme position, the regulation device or the corresponding regulation valve is fitted to control the pressure to the glide-bearing members so as to brake down the movement of the roll mantle and finally to stop the roll mantle in an extreme position.

By means of the present invention, a number of remarkable advantages are obtained, compared with the prior art devices. Of these advantages, the following should be stated. The mode of journalling by means of glide bearings in accordance with the invention permits controlled movements of the roll mantle without outside control. Further, a very precise positioning of the roll mantle is achieved. The glide bearing arrangement automatically adjusts the position of the roll mantle to the correct position if, for some reason, the position of the mantle differs from its preset value. The journalling of the roll is accomplished by means of hydraulic glide-bearing members so that, owing to the mode of regulation, the consumptions of fluid and power are very low. Owing to the mode of mounting by means of glide bearings, the forces acting from the glide-bearing members upon the roll mantle can also be easily minimized. Further, the mode of journalling by means of glide bearings in accordance with the invention protects the fluid films of the glide-bearing members also in the areas of extreme positions of the roll mantle.

Further advantages and characteristic features of the invention come out from the following detailed description of the invention.

BRIEF DESCRIPTION OF THE DRAWINGS

In the following, the invention will be described in detail with reference to the figures in the accompanying drawings and to preferred exemplifying embodiments of the invention illustrated therein.

DETAILED DESCRIPTION OF THE INVENTION

Figure 1:
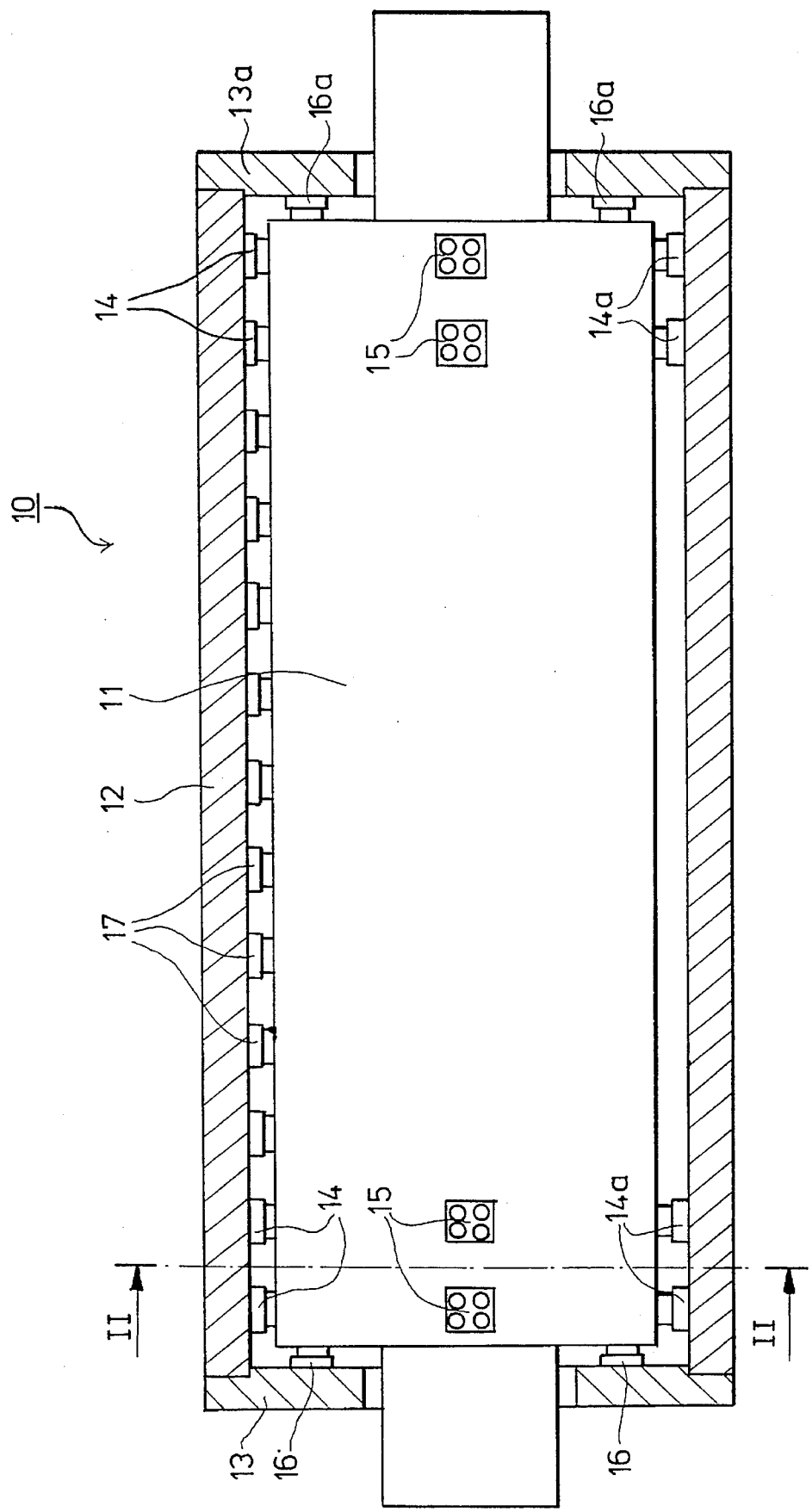
FIG. 1 is a fully schematic sectional side view of a roll fitted with glide bearings in accordance with the invention and which is a variable-crown roll in the exemplifying embodiment shown herein.
Figure 2:
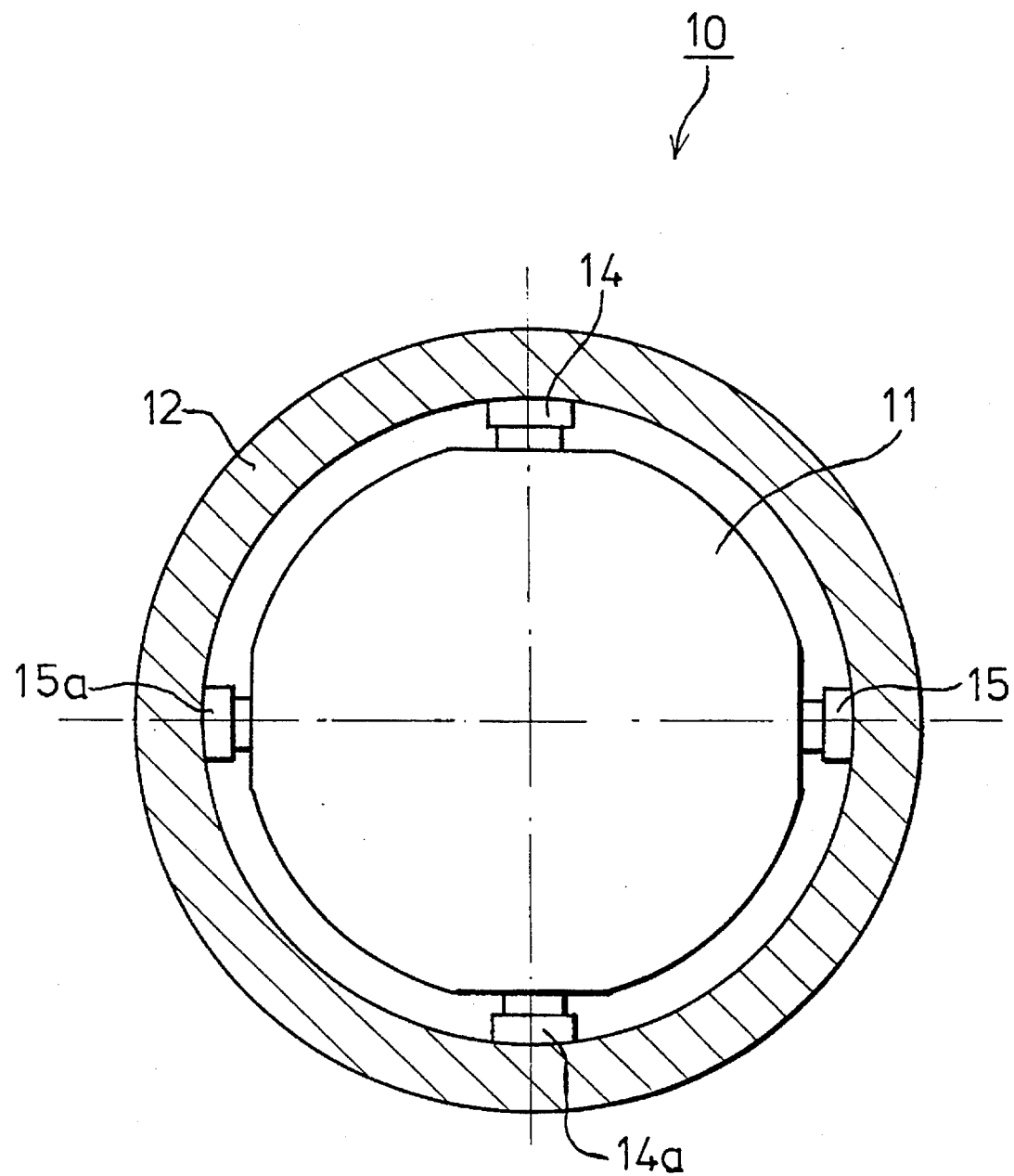
FIG. 2 is schematic sectional view taken along the line II—II in FIG. 1.

FIGS. 1 and 2 are fully schematic sectional views of a tubular roll fitted with glide bearings in accordance with the invention so that FIG. 1 is an axial sectional view in the vertical plane of the roll, and FIG. 2 is a sectional view of the roll as shown in FIG. 1, taken along the line II—II. In FIGS. 1 and 2, the roll is denoted generally by reference numeral 10, and in these illustrated embodiments the roll 10 is a variable-crown roll, which comprises a stationary roll axle 11, on which the roll mantle 12 is fitted to revolve. The roll mantle is supported on the roll axle by means of hydraulic loading members 17. The hydraulic loading members 17 are effective in the direction of the nip plane, and by their means, it is possible to adjust the shape of the roll mantle 12 and control the nip profile of the roll in the axial direction of the roll as desired.

The roll 10 as shown in FIGS. 1 and 2 is a roll provided exclusively with glide- bearings, so that the roll 10 has no conventional roller bearings fitted at the roll ends at all. The journalling of the roll 10 has been accomplished by means of glide-bearing members, of which members the glide-bearing members that are effective in the direction of loading, i.e., in the direction of the nip plane in the case of the roll as shown in FIGS. 1 and 2, are denoted by reference numerals 14 and 14a. The first glide-bearing members 14 are effective in the direction of the nip, i.e., against the loading in the so-called main loading direction, and the second glide-bearing members 14a are effective in the opposite direction. In the exemplifying embodiment shown in FIGS. 1 and 2, it is shown further that the roll is also provided with glide-bearing members 15,15a effective in the direction transverse to the loading direction. There are at least one pair of glide-bearing members 14,14a,15,15a arranged in connection with the roll. Members 15,15a are effective in opposite directions. Of course, conventional roller bearings can be used if desired.

Since the roll 10, as illustrated, is fitted exclusively with glide bearings, it may also be provided with at least one pair of glide-bearing members 16,16a effective in the axial direction of the roll in opposite directions. Members 16,16a are supported by the intermediate of a fluid film against the roll ends 13,13a, respectively. As shown in FIGS. 1 and 2, the glide-bearing members 14,15,14a,15a effective in the radial direction are supported against the inner face of the roll mantle 12 by the intermediate of a fluid film. In the illustrated embodiment shown in FIG. 1, the glide-bearing members 14,14a,15,15a effective in the radial direction are arranged in pairs so that there are two pieces of each glide-bearing member which are placed side by side in the axial direction. However, in view of the operation, such an arrangement is not an indispensable requirement since the journalling of the roll can also be accomplished by other means, for example, by means of single glide-bearing members alone or more than two such glide-bearing members.

In the illustrated embodiments shown in FIG. 2, the glide-bearing members 14,14a,15,15a are arranged to act in the direction of loading of the nip and in the direction transverse to the nip-loading direction. However, there may also be a higher number of glide-bearing members, which are fitted to act radially in different angular positions. Regarding the axial glide-bearing members, it can be stated further that, differing from FIG. 1, the axial movements of the roll mantle 12 can be controlled by means of just single glide-bearing members.16,16a alone, which are effective in the same plane in opposite directions. There may also be a higher number of such axial glide-bearing members 16,16a, which are, for example, uniformly spaced to act upon the inner faces of the roll ends 13,13a.

Figure 2A:
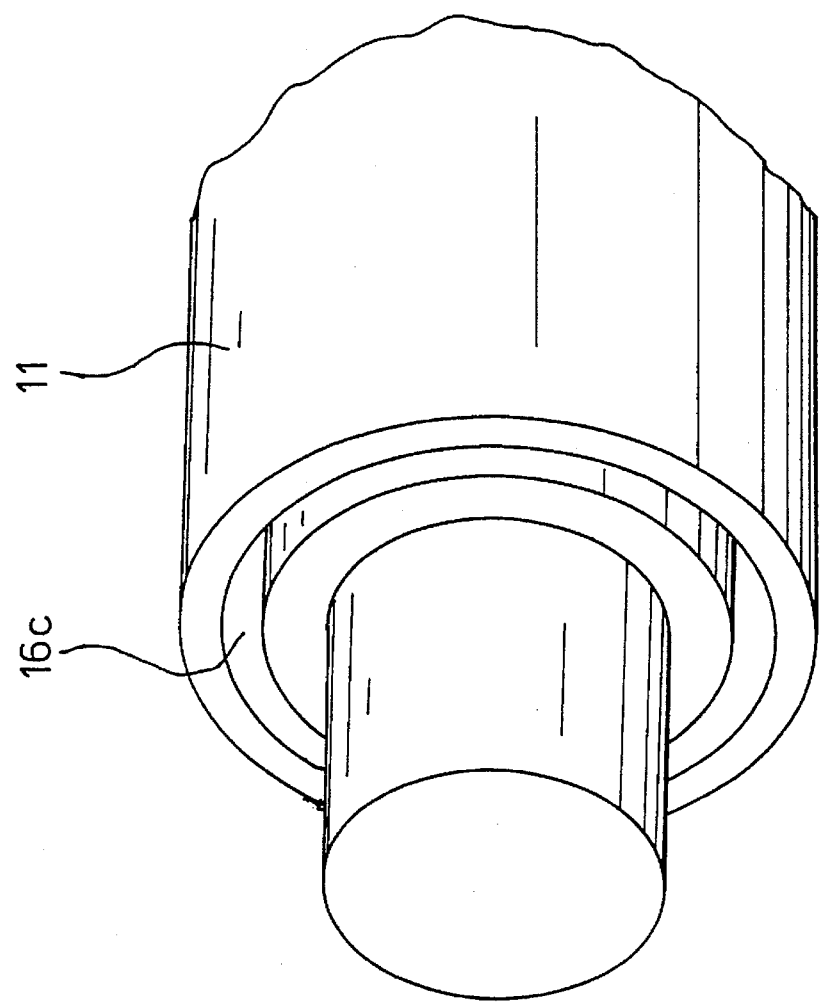
FIG. 2A schematic perspective view of an exemplifying embodiment of a preferred construction of the axial support of the roll.
Figure 2A:
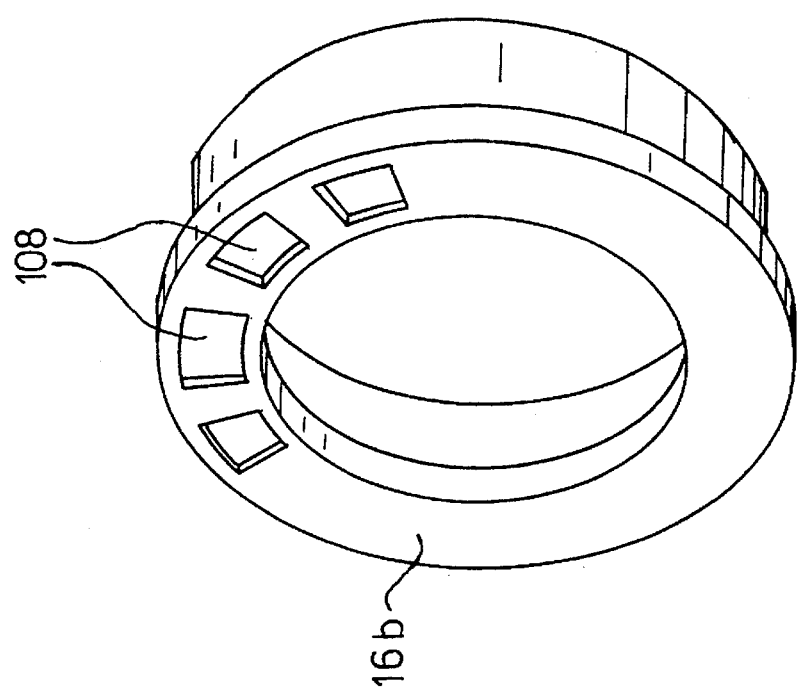

In FIG. 2A, a preferred embodiment of the axial glide-bearing members is shown. In this embodiment, axial glide-bearing shoes 16b are annular glide bearings having a support face which is supported against the roll end 13,13a. Fluid pockets 108 are formed in the support face. Similarly, an annular groove 16c is formed into the roll axle 11, in which the "piston part" of the glide-bearing member 16b is fitted. The axial support can also be arranged so that glide-bearing members 16b are supported against the same roll end 13 from opposite sides, in which case axial glide bearings are not needed at the opposite end of the roll.

Figure 3:
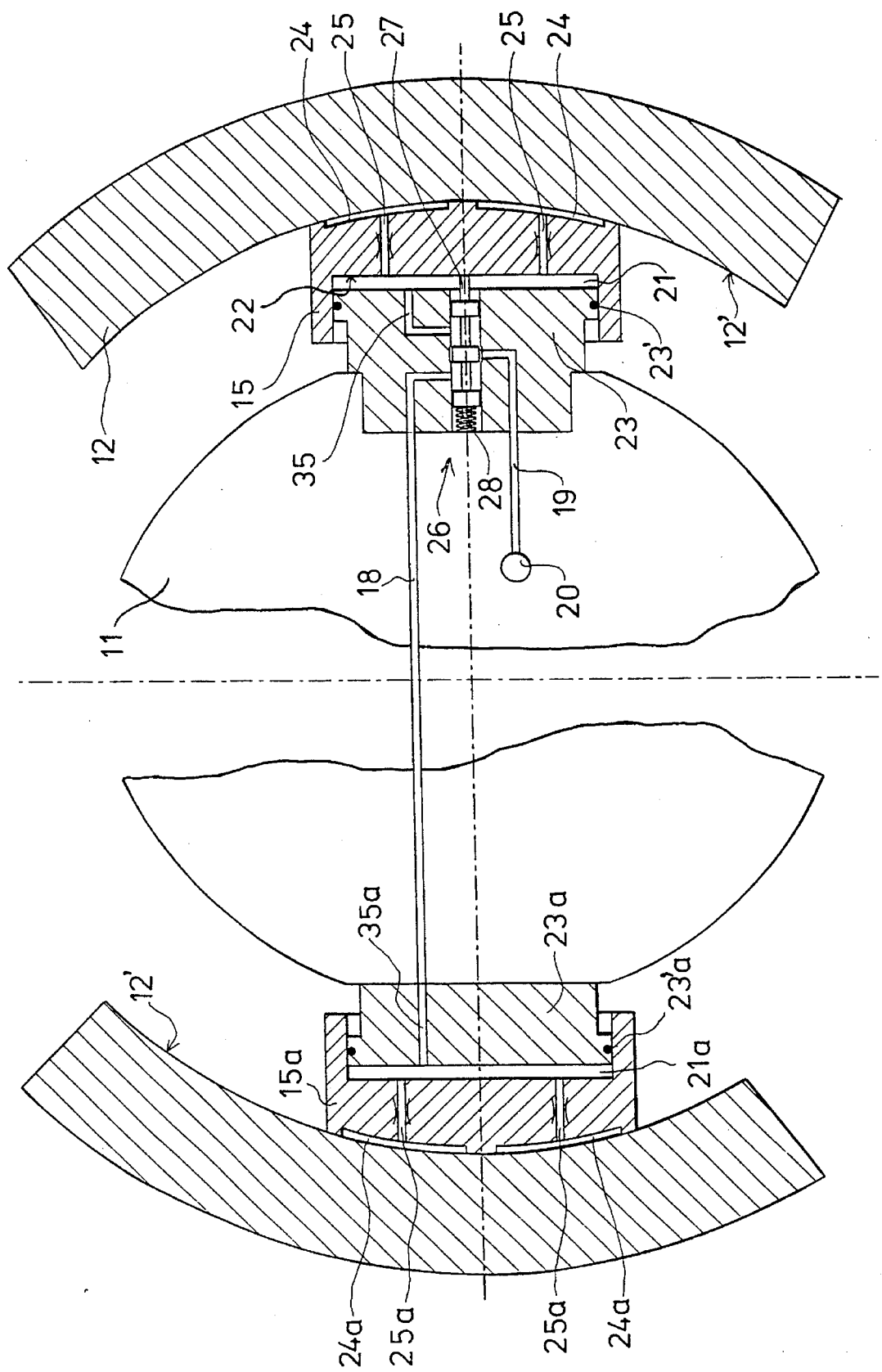
FIG. 3 is a more detailed and partly sectional view of a first embodiment of the lateral support of a roll fitted with glide bearings in accordance with the present invention.

FIG. 3 is a schematic sectional view of a first embodiment of the support means of the roll mantle 12 viewed in a direction transverse to the loading direction. As in FIGS. 1 and 2, in FIG. 3, the roll mantle is denoted by the reference numeral 12 and the roll axle is denoted by the reference numeral 11. To begin with, the general construction of the solution used for lateral support of the roll mantle 12 will be described. As stated earlier, the roll mantle 12 is supported on the roll axle 11 by means of bearing shoes 15,15a arranged substantially in the direction transverse to the loading direction. Bearing shoes 15,15a act to support the roll mantle in opposite directions. With regard to the operation of the bearing shoes, the glide-bearing members or bearing shoes 15,15a are conventional, so that the glide-bearing members 15,15a are supported against the inner face 12' of the roll mantle by the intermediate of a fluid film.

In the illustration in FIG. 3, frame pieces 23,23a are mounted on the roll axle 11, and the glide-bearing members 15,15a are provided with cavity spaces 21,21a which are pressurized by means of a hydraulic pressure medium. Frame pieces 23,23a are arranged to penetrate into the cavity spaces. The frame pieces 23,23a are sealed by means of the seals 23', 23'a in relation to the cavity spaces 21,21a in the glide-bearing members 15,15a. Into the outer faces of the glide-bearing members 15,15a, fluid pockets 24,24a have been formed in a conventional way. The fluid pockets communicate through capillary bores 25,25a with the cavity spaces 21,21a to be pressurized. Thus, pressure medium that is used for the loading of the glide-bearing members 15,15a passes out of the cavity spaces 21,21a through the capillary bores 25,25a into the fluid pockets 24,24a to form a fluid film between the glide-bearing members 15,15a and the inner face 12' of the roll mantle. The pressure medium used for the loading of the glide-bearing members 15, 15a is introduced into the roll along a central duct 20, from which it is passed to the glide-bearing members 15,15a through a feed duct 19. The feed duct 19 does not communicate directly with the glide-bearing members 15,15a. Rather, the roll is provided with a regulation device 26, which distributes the pressure medium to the glide-bearing members 15,15a and thus controls the pressure effective in each of the glide-bearing members 15,15a.

In the embodiment of FIG. 3, the regulation device 26 is arranged in the frame piece 23 of the first glide-bearing member 15 and has a pressure medium passing therethrough. From the regulation device 26, the pressure medium is passed into the cavity space 21 of the first glide-bearing member 15 along a pressure duct 35, and into the cavity space 21a of the second glide-bearing member 15a along a connecting duct 18 and pressure duct 35a formed into the frame piece 23a of the second glide-bearing member 15a.

Figure 3A:
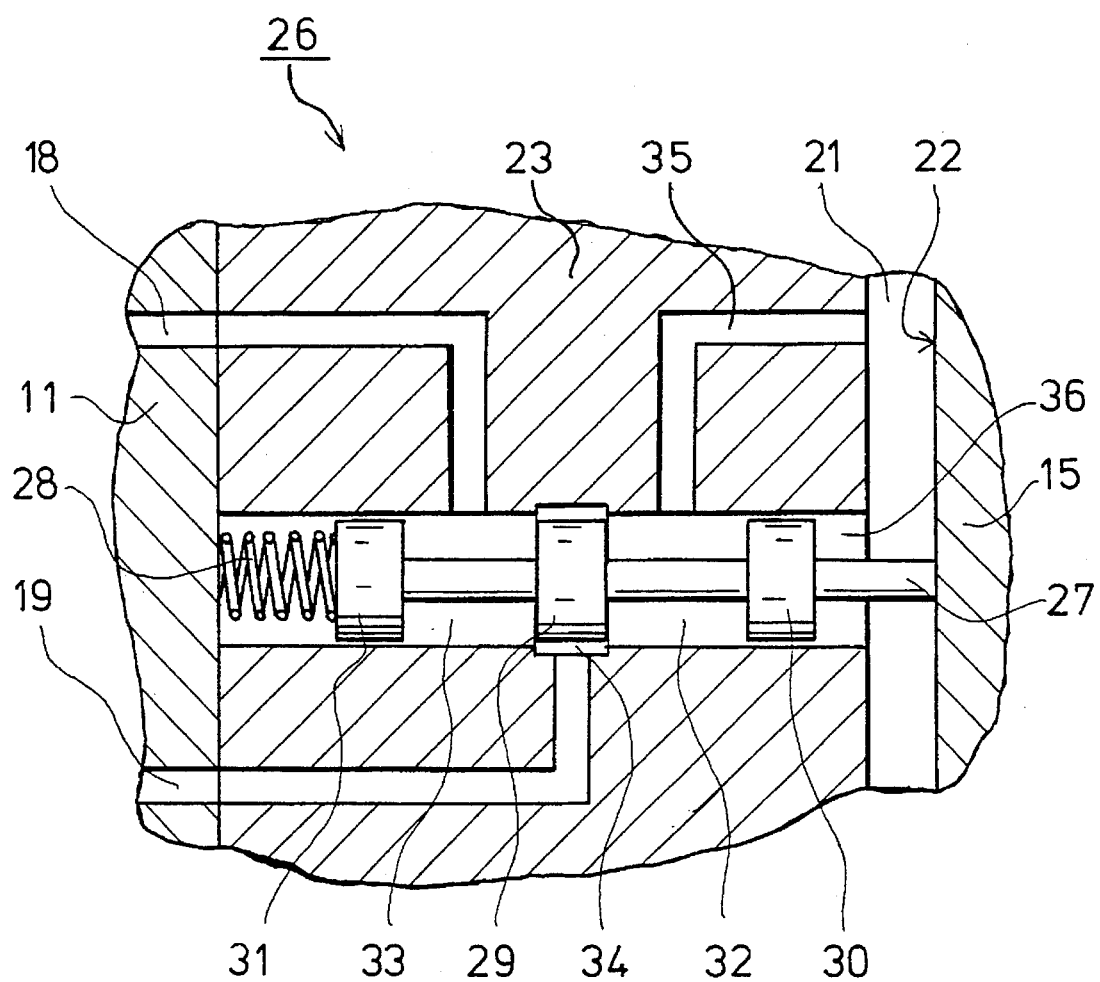
FIG. 3A is a more detailed illustration of a regulation device used for the lateral support of the roll mantle of the roll as shown in FIG 3.

The construction and the operation of the regulation device 26 are described in more detail in relation to FIG. 3A. The regulation device 26 comprises a valve, which is composed of a three-part slide 29,30,31 fitted in a bore 36 which has been formed in the frame piece 23 of the first glide-bearing member 15. The middle part 29, the first end part 30, and the second end part 31 of the slide communicate with one another through a spindle 27. The slide parts 29,30,31 are placed at a distance from one another so that flow passages 32,33 for the pressure medium remain between the slide parts. The first flow passage 32 communicates through the pressure duct 35 with the cavity space 21, and in a corresponding way, the second flow passage 33 communicates with the cavity space 21a of the second glide-bearing member 15a through the connecting duct 18 and through the pressure duct 35a that has been formed into the frame piece 23a of the second glide-bearing member 15a. A spring 28 is installed on the bottom of the bore 36 behind the three-part slide 29,30,31 of the regulation device 26. The spring 28 loads the slide 29,30,31 towards the glide-bearing member 15 so that the spindle 27 is supported against the bottom 22 of the cavity space. The pressure medium is passed to the regulation device 26 along the feed duct 19, and into the bore 36. An annular groove 34 is formed at the level of and aligns with the feed duct 19, and through which groove 34, the pressure medium has access in the desired way, through the first and/or the second flow passage 32/33, into the cavity space 21,21a of the first and/or the second glide-bearing member. FIG. 3A illustrates just one exemplifying embodiment of a slide construction. In consideration of the same functions, the slide may also be constructed in a different way. Other suitable and compatible fluid regulation means may also be used in the present invention.

By means of the regulation device 26, as was stated above, the lateral, external forces applied to the roll are substantially neutralized. The regulation device 26 has been constructed so that the flow, and thus the pressure, of the pressure medium is controlled to each glide-bearing member 15,15a so that the higher pressure is applied to the side of loading to shift the roll mantle 12 against the external loading forces. It can be seen in FIG. 3A that, if an outside loading is applied against the direction of loading of the first glide-bearing member 15, the three-part slide 29,30,31 is pushed against the force of the spring 28 to the left, whereupon it opens the first flow passage 32 and closes the second flow passage 33. In such a case, the pressure of the pressure medium coming from the feed duct 19 is passed through the first flow passage 32 and through the pressure duct 35 into the cavity space 21 of the first glide-bearing member 15. At the same time, the middle part of the slide prevents access of the pressure into the cavity space 21a of the second glide-bearing member 15a. Thus, a higher pressure is passed into the cavity space 21 of the first glide-bearing member 15, whereby this pressure adjusts the position of the mantle to the correct position.

The construction of the regulation device 26 is such that even a very small movement of the roll mantle 12 controls the flow and the pressure in the desired way. As shown in FIG. 3A, this is accomplished simply so that the axial length of the middle part 29 of the slide is slightly shorter than the axial length of an annular groove 34 formed into the bore 36. When the length of the middle part 29 of the slide is substantially equal to the axial length of the annular groove 34 that has been formed into the bore 36, for example, by means of the shape of the middle part 29 of the slide as shown in the figure, in the middle position shown in FIG. 3A, fluid has access to both of the glide-bearing members 15,15a. Immediately when the slide 29,30,31 is shifted away from the middle position shown in FIG. 3A, the flow passage is opened to one of the cavity spaces 21,21a, at the same time as the flow passage to the opposite cavity space is closed. Thus, the regulation device 26 reacts immediately and without delay to the movements of the roll mantle 12.

Figure 4:
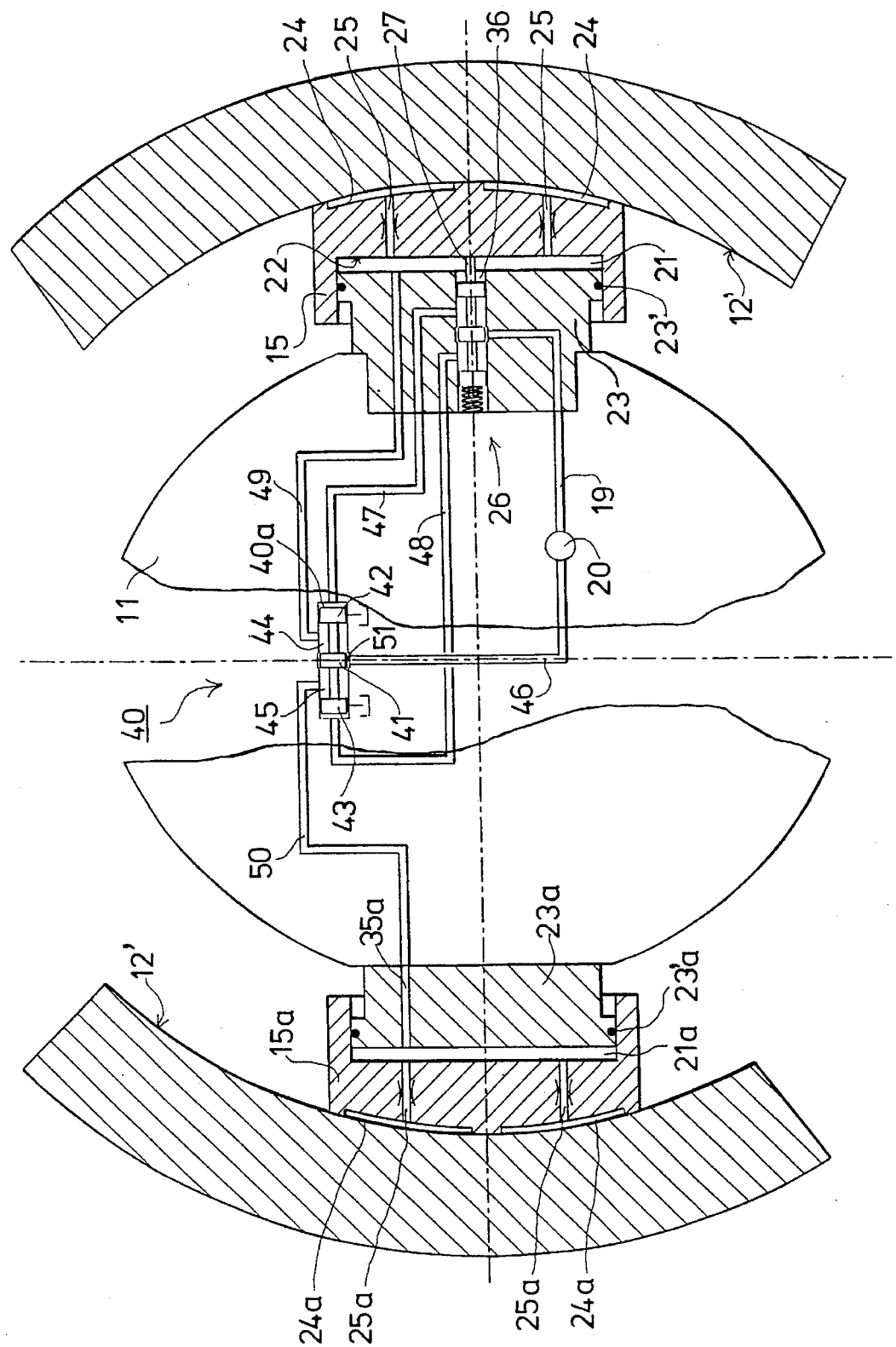
FIG. 4 is an illustration corresponding to FIG. 3 of a second embodiment of the lateral support of the roll mantle.

FIG. 4 shows a second embodiment of the lateral support of the roll mantle in a roll fitted with glide bearings. The solution shown in FIG. 4 differs from that shown in FIG. 3 in the respect that the embodiment of FIG. 4 is provided with a pre-guiding arrangement of the lateral support, and therefore the embodiment will be described here in its entirety.

In FIG. 4, the roll mantle of the roll fitted with glide bearings is denoted by the reference numeral 12, and the roll axle is denoted by the reference numeral 11. In this embodiment, the roll is provided with glide-bearing members 15,15a acting in the direction transverse to the loading direction and, as in the embodiment of FIG. 3, also acting in directions opposite to one another. The glide-bearing members 15,15a comprise a frame piece 23,23a which is attached to the roll axle 11 and on which the glide-bearing member 15,15a itself is fitted so that the frame piece 23,23a penetrates into the cavity space 21,21a formed into the glide-bearing member 15,15a and can be pressurized. The frame piece 23,23a is sealed by means of the seal 23' 23'a in relation to the cavity space 21,21a. Oil pockets 24,24a have been formed in the outer face of the glide-bearing members 15,15a and communicate with the pressurized cavity space 21,21a in the glide-bearing member through capillary bores 25,25a. Pressure medium that is used for pressurizing the glide-bearing members 15, 15a, in particular oil, is passed through the capillary bores 25,25a into the oil pockets 24,24a to form a fluid film between the glide-bearing members 15,15a and the inner face 12' of the roll mantle.

In the frame piece 23 of the first glide-bearing member 15, a regulation device 26 similar to that described in connection with the embodiments shown in FIGS. 3 and 3A is situated. The regulation device 26 comprises a bore 36, which has been formed in the frame piece 23 of the first glide-bearing member 15 and into which a three-part slide 29,30,31 is arranged in the manner shown in FIG. 3A. The slide 29,30,31 is provided with a spindle 27, which rests against the bottom surface 22 of the cavity space in the first glide-bearing member, and a spring 28 is arranged in the bottom of the bore 36. The spring loads the slide against the bottom 22 of the cavity space. The regulation device 26 is provided with two flow passages 32,33, which are defined by the middle part 29 of the slide and by the first end part 30, on one hand, and by the second end part 31, on the other hand. When the slide 29,30,31 is in the middle position shown in FIG. 4, both of the flow passages communicate through an annular groove 34 and the feed duct 19 with the central duct 20, through which the pressure medium is fed to the glide-bearing members 15,15a.

The regulation device 26 does not distribute the pressure medium directly to the glide-bearing members 15,15a depending on the position of the slide 29,30,31 of the regulation device 26. Rather, in the embodiment of FIG. 4, the roll is additionally provided with a regulation valve 40. The regulation device 40 comprises a three-part slide 41,42, 43 that moves in the bore 40a, the middle part 41 and the end parts 42 and 43 of the slide defining a first flow passage 44 and a second flow passage 45 between them. The regulation valve 40 is provided with a pressure-feed duct 46, which preferably communicates with the same middle duct 20 through which pressure medium is fed to the regulation device 26. When the slide 41,42,43 of the regulation valve 40 is in the middle position shown in FIG. 4, pressure medium has access through the pressure-feed duct 46 into an annular groove 51 formed into the bore 40a, and passes from the groove further to each flow passage 44,45. When the slide 41,42,43 is shifted away from the middle position shown in FIG. 4, e.g., to the left, the middle part 41 of the slide closes the connection of the pressure-feed duct 46 of the regulation valve with the second flow passage 45 and makes the connection open more widely with the first flow passage 44.

The first flow passage 44 communicates through a first pressure duct 49 with the cavity space 21 of the first glide-bearing member 15. Similarly, the second flow passage 45 communicates through a second pressure duct 50 with the pressure duct 35a formed into the frame piece 23a of the second glide-bearing member 15a, and communicates through duct 35a further with the cavity space 21a. The first flow passage 32 in the regulation device 26 communicates through the first pressure-control duct 47 with the bore 40a of the regulation valve 40 behind the first end part 42 of the slide. Similarly, the second flow passage 33 of the regulation device 26 communicates through the second pressure-control duct 48 with the bore 40a of the regulation valve 40 behind the second end part 43 of the slide.

In the embodiment of FIG. 4, the higher pressure is controlled through both the regulation device 26 and the regulation valve 40 to the glide-bearing member 15,15a at the side from whose direction an outside load is applied to the roll. In this case, the glide-bearing member placed at this side shifts the roll mantle 12 against the outside load. In practice, this takes place so that, for example, when an outside load is applied to the roll from the left as shown in the FIG. 4, attempting to shift the roll mantle 12 to the right in FIG. 4, the slide 29,30,31 of the regulation device 26 is also shifted to the right, being shifted by the spring 28 such that a connection is opened from the feed duct 19 to the second flow passage 33. At the same time, the connection with the first flow passage 32 is closed by the effect of the middle part 29 of the slide. In such a case, the pressure in the feed duct 19 has access through the second flow passage 33 and through the second pressure-control duct 48 so as to affect behind the second end part 43 of the three-part slide in the regulation valve 40.

The pressure shifts the slide 41,42,43 of the regulation valve 40 to the right in FIG. 4, in which case the middle part 41 of the slide closes the connection from the pressure-feed duct 46 of the regulation valve to the first flow passage 44 of the regulation valve and opens the connection from the pressure-feed duct 46 of the regulation valve to the second flow passage 45 of the regulation valve. In this manner, the pressure medium flows from the passage 45 further along the second pressure duct 50 and along the pressure duct 35a present in the frame piece 23a of the second bearing member 15a into the cavity space 21a in the second bearing member 15a. In the cavity space 21a of the second glide-bearing member 15a, a pressure is formed that is higher than the pressure that is present in the cavity space 21 in the first glide-bearing member 15. The higher pressure attempts to adjust the position of the roll mantle 12 to the correct position in which the external forces are neutralized. After the position of the roll mantle 12 has been corrected, the slides 29,30,31 and 41,42,43 both of the regulation device 26 and of the regulation valve 40. return to the middle positions shown in FIG. 4, whereby the situation returns to normal.

The operation of the embodiment as shown in FIG. 4 is to a large extent similar to that described in FIG. 3. However, there is a difference in that, in the embodiment of FIG. 4, a pre-control is provided by means of the regulation valve 40. This is advantageous since in the embodiment of FIG. 4, transverse movement of oscillation of the roll mantle 12 cannot take place as may be possible in some cases in the embodiment of FIG. 3, in which no pre-control is used. Also, the construction of the regulation valve 40 is such that even a very small movement of the mantle 12 controls the flow and the pressure in the desired way. This has been accomplished in a manner similar to that described in relation to FIG. 3A with respect to the regulation device 26, i.e., so that the dimensions of the middle part 41 of the slide in relation to an annular groove 51 and/or the shape of the middle part 41 of the slide has/have been selected appropriately. In this manner, even a very small movement of the slide 41,42,43 controls the flow of the pressure medium, and thus the pressure, either into the first pressure duct 49 or into the second pressure duct 50.

Figure 5:
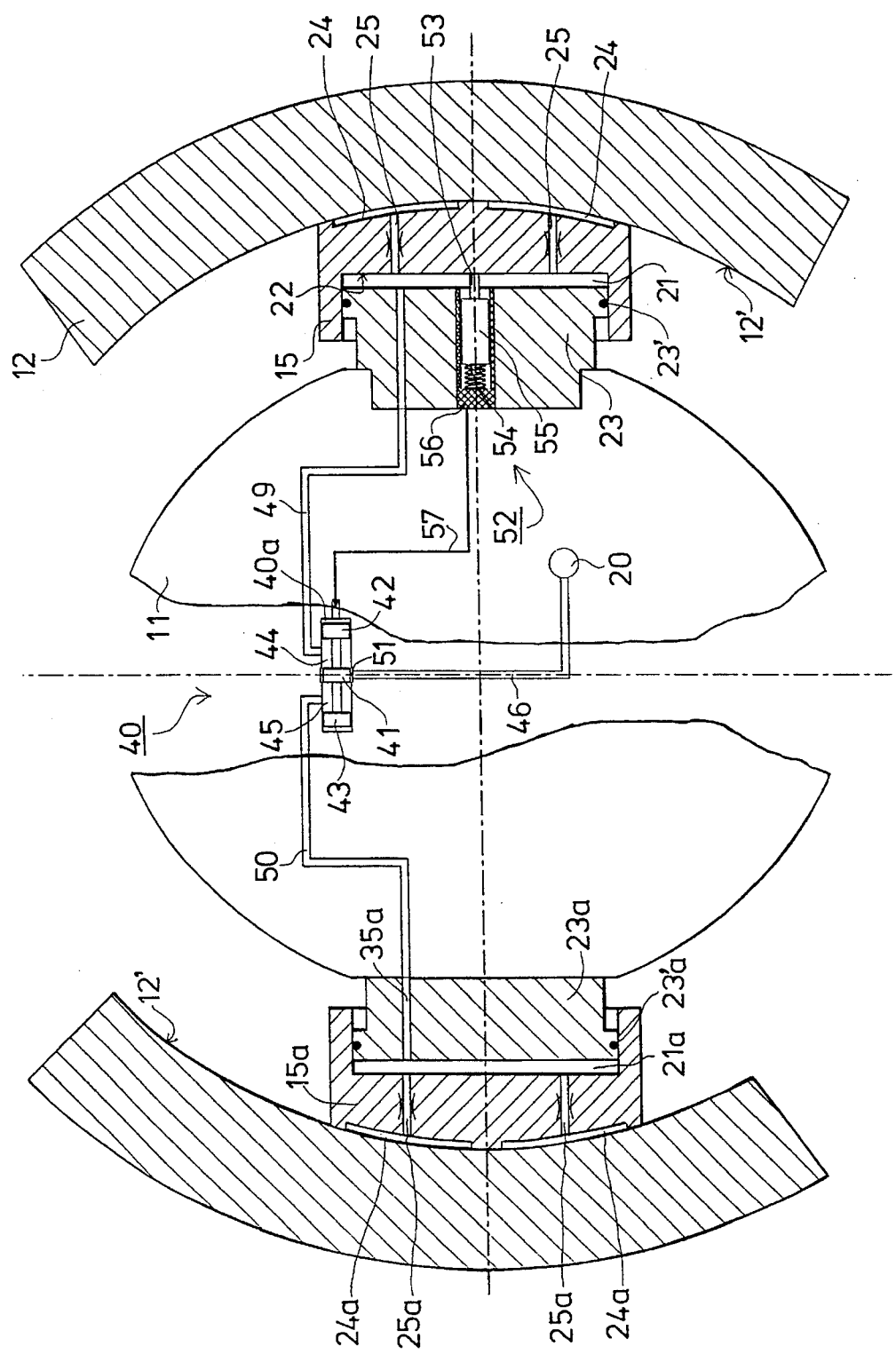
FIG. 5 is an illustration corresponding to FIGS. 3 and 4 of a third embodiment the lateral support of the roll mantle.

FIG. 5 shows a third embodiment of the lateral support of the roll mantle 12 in a roll provided with glide bearings in accordance with the invention. This embodiment differs from those described above in particular in the respect that the position and the movements of the roll mantle 12 are measured in a different manner from the above embodiments. Also in the embodiment of FIG. 5, the roll is provided with glide-bearing members 15,15a acting in the direction transverse to the loading direction and in opposite directions. The bearing members are supported against the inner face 12' of the roll mantle. As described above, the glide-bearing members 15,15a are provided with cavity spaces 21,21a, into which the frame piece 23,23a, which is attached to the roll axle 11, penetrates. The frame piece 23,23a are sealed in relation to the cavity space 21,21a by the intermediate of the seal 23' 23'a Further, the outer faces of the glide-bearing members 15,15a are provided with oil pockets 24,24a, which communicate with the pressurized cavity space 21,21a through capillary bores 25,25a formed through the glide-bearing members 15,15a. Fluid has access from the cavity space 21,21a through the capillary bores 25,25a into the oil pockets 24,24a and forms a fluid film between the glide-bearing members 15,15a and the inner face 12' of the roll mantle.

In the embodiment of FIG. 5, a position-measurement device 52 is arranged in the frame piece 23 of the first glide-bearing member 15. The position-measurement device 52 measures the position of the first glide-bearing member 15 in relation to the frame piece 23 and, thus, the position of the roll mantle 12 in relation to the roll axle 11. The position-measurement device 52 comprises a frame 56 of the measurement device, in which a slide 55 is arranged. The frame 56 is provided with a spindle 53 which is loaded by means of a spring 54 so that the spindle 53 is supported against the bottom surface 22 of the cavity space in the first glide-bearing member 15. The position-measurement device 52 operates electromagnetically, or in another equivalent manner. FIG. 5 specifically illustrates a position-measurement device that operates electromagnetically.

The embodiment of FIG. 5 is provided with a regulation valve 40 of a type similar to that described in connection with the embodiment of FIG. 4. The pressure medium, used for pressurization of the glide-bearing members 15,15a, is thus passed from the central duct 20 through the pressure-feed duct 46 of the regulation valve into the regulation valve 40, which distributes the flow and the pressure in the desired and intended way to both of the glide-bearing members 15,15a. The regulation valve 40 differs from that shown in FIG. 4 in the respect that, whereas the position of the slide 41,42,43 of the regulation valve 40 was controlled by means of pressure in the embodiment of FIG. 4, in the embodiment of FIG. 5 the position and movement of the slide 41,42,43 is controlled electromagnetically. In FIG. 5, this electromagnetic control is illustrated by means of the reference numeral 57, which denotes an electromagnetic control connection from the position-measurement device 52 to the control valve 40.

In the embodiment of FIG. 5, the control of the movements of the roll mantle 12 in the direction transverse to the loading direction takes place so that, when an outside load is applied to the roll mantle from the right side, the roll mantle 12 attempts to move to the left in FIG. 5. In this case, the first glide-bearing member 15 and, also the slide 55 of the position-measurement device 52 by the effect of the spindle 53, move to the left in FIG. 5 against the force of the spring 54. This movement is achieved by the intermediate of the control connection 57 electromagnetically giving a control command to the slide 41,42,43 of the regulation valve 40 also to shift the slide to the left in FIG. 5. During this movement, the middle part 41 of the slide closes the connection from the pressure-feed duct 46 of the regulation valve through the second flow passage 45, through the second pressure duct 50, and through the pressure duct 35*a* placed in the frame piece 23 into the cavity space 21*a* of the second glide-bearing member 15*a*. In a corresponding manner, the middle part 41 of the slide opens the connection from the pressure-feed duct 46 of the regulation valve through the first flow passage 44 of the regulation valve 40 into the first pressure duct 49 and from it, the pressure medium flows further into the cavity space 21 of the first glide-bearing member 15. As a result of this movement of the middle part 41 of the glide, the flow of pressure medium into the cavity space 21 of the first glide-bearing member 15 becomes larger, and thus the pressure in the cavity space 21 is increased. This higher pressure shifts the roll mantle 12 against the outside loading and adjusts the position of the roll mantle 12 to the correct position from the position to which it had been shifted by the outside load. Once the position of the roll mantle 12 has been corrected, the slide 41,42,43 of the regulation valve 40 returns to the middle or neutral position shown in FIG. 5. The operation is, of course, similar if an outside load is applied to the roll from the opposite direction.

Figure 6:
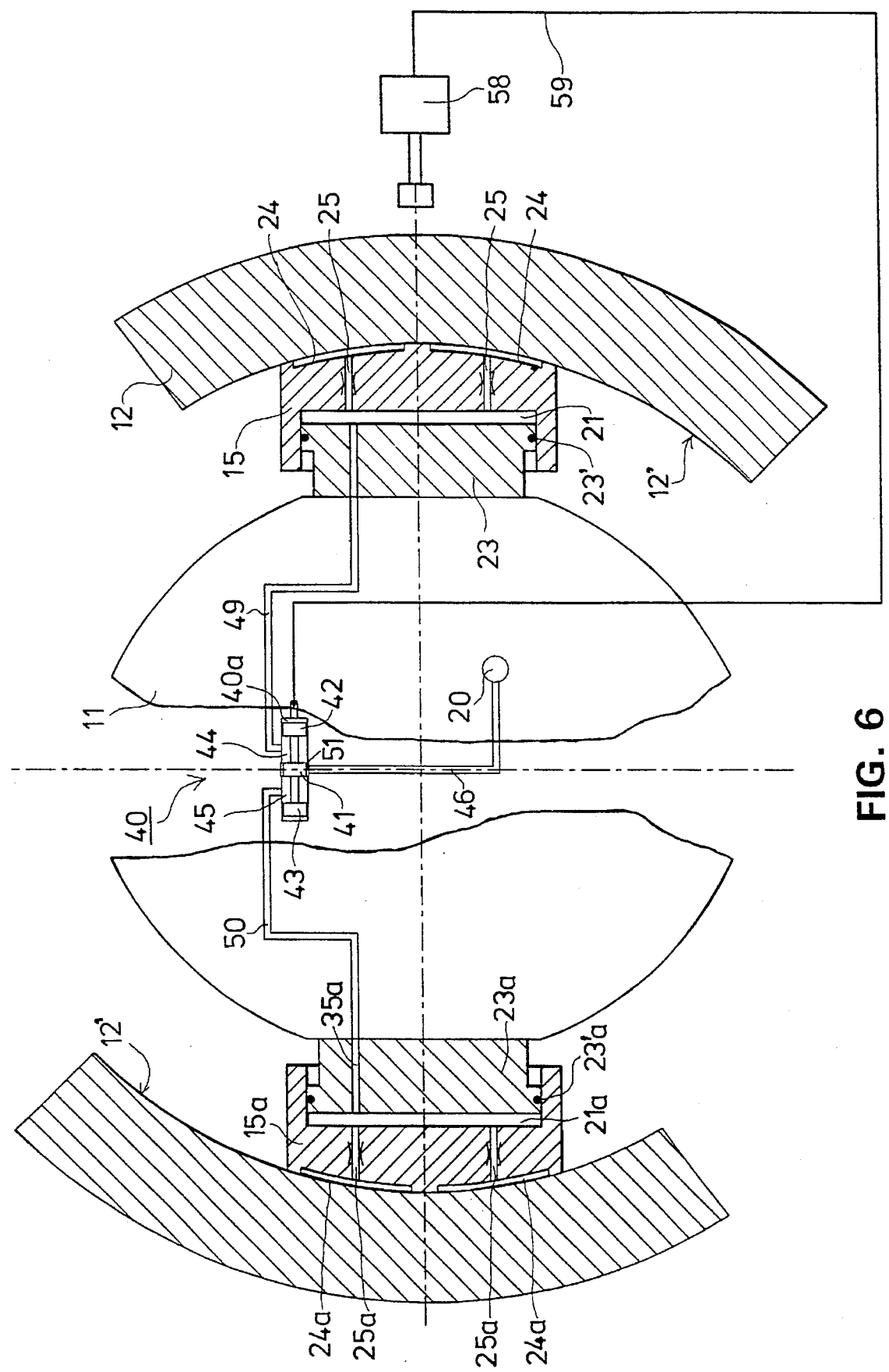
FIG. 6 is an illustration corresponding to FIGS. 3–5 of a fourth embodiment of the lateral support of the roll mantle.

FIG. 6 shows a fourth embodiment of the lateral support of the roll mantle 12 in a roll provided with glide bearings. This embodiment is to a large extent similar to that shown in FIG. 5, so that in the embodiment of FIG. 6 the roll is provided with glide-bearing members 15,15*a* similar to those shown in the embodiment of FIG. 5 and, further, in the embodiment of FIG. 6 the roll is provided with a regulation valve 40 similar to that described in relation to FIG. 5. The embodiment of FIG. 6 differs from that shown in FIG. 5 in the respect that, whereas in the embodiment of FIG. 5 the device 52 for measurement of the position of the roll mantle was arranged inside the roll to measure the position of the roll mantle 12 by the intermediate of the first glide-bearing member 15, in the embodiment of FIG. 6, a position-measurement device 58 is arranged outside the roll. From the position-measurement device 58 to the regulation valve 40, there is a similar electromagnetic control connection 59 as described in relation to FIG. 5.

In the embodiment of FIG. 6, the measurement device 58 may comprise a contact-free detector, as shown in FIG. 6, or, differing from the illustrate embodiment in FIG. 6, the detector may be such that the detector is provided with a follower member, which continually rests against the outer face of the roll 12 all the time. From the position-measurement device 58, information is transmitted constantly, electromagnetically or in an equivalent manner, representative of the position of the roll mantle 12, along the electromagnetic or equivalent control connection 59 to the regulation valve 40, whose operation is identical with that illustrated in FIG. 5. Thus, in the embodiment of FIG. 6, the roll mantle 12 is kept in a fully corresponding manner in its correct position, as was already described above.

Referring to the embodiments shown in FIG. 3–6, it should be stated that therein, preferred alternative embodiments of the invention are described from among various ways in which the glide-bearing members 15,15*a* can be positioned and constructed. The glide-bearing members 15,15*a* may differ even considerably from the construction shown in FIGS. 3–6. Further, it should be stated that, even though, in FIGS. 4–6, the regulation valve 40 has been accomplished as a construction inside the roll, the entire regulation valve 40 may also be arranged outside the roll, while the operation of the solution is, nevertheless, identical with that described above. The construction of the regulation valve 40 may also differ from the illustrations as long as it provides a similar operation.

Figure 7:
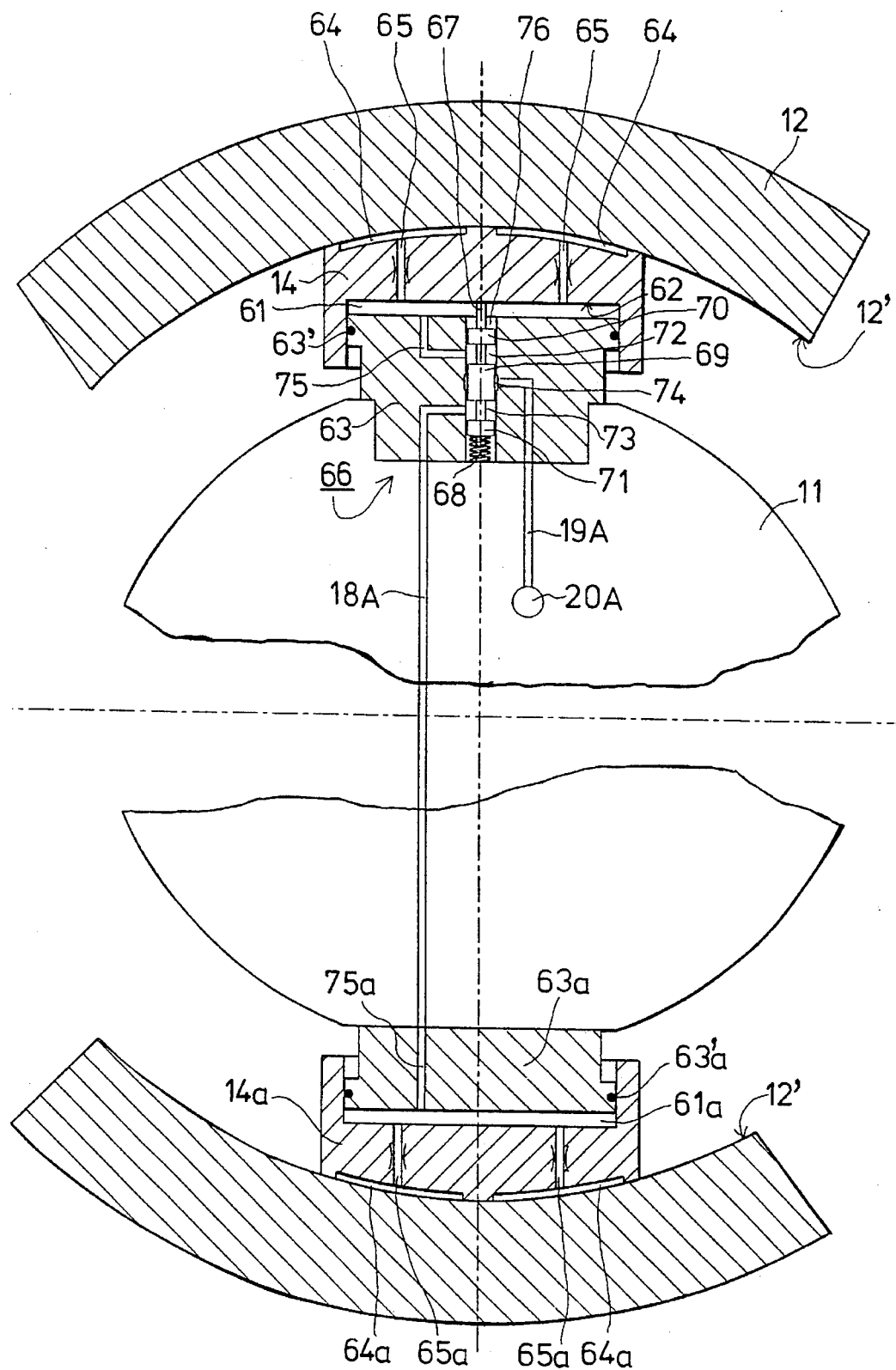
FIG. 7 is a schematic and partly sectional view of a first embodiment of the support of the roll mantle and the control system for the movements of the roll mantle in the direction of loading of the roll in accordance with the invention.

FIG. 7 is a schematic and partly sectional view of a first embodiment of the support arrangement and journalling of a roll fitted with glide bearings in the loading direction proper, i.e., in the case of a variable-crown roll 10 as shown in FIG. 1, in the direction of the nip plane. In FIG. 7, the roll axle is denoted by the reference numeral 11, and the roll mantle denoted by the reference numeral 12. In the following, to begin with, the construction of the support arrangement as shown in FIG. 7 will be described, followed by a description of the operation of the support arrangement.

The roll mantle 12 is supported by means of glide-bearing members 14,14*a* loaded against the inner face 12' of the roll mantle. Bearing members 14,14*a* act, in the manner shown in FIG. 7, in opposite directions so that the first glide-bearing member 14 loads the roll mantle 12 towards an outside load applied to the roll mantle, i.e., in the case shown in FIG. 1, towards the nip, and the second glide-bearing member 14*a* loads the roll mantle in the opposite direction. In the construction shown in FIG. 7, the glide-bearing members 14,14*a* are provided with cavity spaces 61,61*a* that can be pressurized. For each glide-bearing member 14,14*a*, frame pieces 63,63*a* are mounted on the roll axle 11. The frame pieces 63,63*a* penetrate into the cavity spaces 61,61*a* in the glide-bearing members and are sealed in relation to the cavity spaces by means of seals 63' 63'*a* so that the glide-bearing members 14,14*a* can move in relation to the frame pieces 63,63*a*. Regarding their construction, the glide-bearing members 14,14*a* are conventional, so that their outer faces are provided with oil pockets 64,64*a*, which communicate with the cavity spaces 61,61*a* through capillary bores 65,65*a* that pass through the glide-bearing members. Thus, from the pressurized cavity spaces 61,61*a*, through the capillary bores 65,65*a*, pressure medium, in particular oil, has access into the oil pockets 64,64*a* to form a fluid film between the glide-bearing members 14,14*a* and the inner face 12' of the roll mantle.

In the illustration in FIG. 7, the first glide-bearing member 14 that acts in the loading direction is provided with a regulation device 66 which comprises a bore 76 formed into the frame piece 63 of the glide-bearing member and in which a three-part slide 69,70,71 has been displaceably arranged. The slide comprises a middle part 69, a first send part 70, and a second end part 71. The slide parts 69,70,71 are interconnected by a spindle 67 which keeps the slide parts apart from one another. The spindle 67 rests against the bottom 62 of the cavity space of the first glide-bearing member 14. On the bottom of the bore 76, underneath the second end part 71 of the slide, a spring 68 is arranged to load the spindle 67 against a bottom surface 62 of the cavity space. The regulation device 66 comprises of a valve into which a pressure medium is fed through a middle duct 20*a* and a feed duct 19*a* the valve distributes the pressure and the flow of the pressure medium that has been fed therein, in the desired predetermined proportion through flow passages 72 and 73 defined by the slide parts 69,70,71 of the regulation device 66. The pressure medium flows through the connecting duct 18a and through the pressure ducts 75,75a formed into the frame pieces 63,63a of the glide-bearing members 14,14a into the cavity spaces 61,61a in the glide-bearing members 14,14a. An annular groove 74 is formed into the bore 76 at the connection point between the feed duct 19a and the bore 76.

In a roll in accordance with the invention, the roll mantle 12 can move radially in relation to the roll axle 11 in the direction of loading. In the embodiment illustrated in FIG. 7, the roll mantle 12 is shown in the middle position, and from this middle position, the roll mantle 12 is allowed to move a certain distance in both directions to a preset extreme position. For example, when a variable-crown roll 10 as shown in FIG. 1 is concerned, which forms a nip with a back-up roll, a suitable permitted movement of the roll mantle 12 is, e.g., about 25 mm in both directions. This measure is, of course, just given as an example. By means of the regulation device 66, the movements of the roll mantle 12 are controlled in the direction of loading concerned, and the movement is restricted to the desired maximum value. As can be seen from FIG. 7, the axial length of the middle part 69 of the slide of the regulation device 66 is larger than the axial length of the annular groove 74 formed in the bore 76. This dimensioning has a decisive significance for the control of the movements of the roll mantle 12.

In the embodiment shown in FIG. 7, when the roll mantle 12 is in the middle or neutral position, the middle part 69 of the slide completely covers the annular groove 74. When the roll mantle 12 starts moving from the position shown in FIG. 7 in either direction, e.g., downwardly in FIG. 7, the first glide-bearing member 14 which is loaded against the inner face 12' of the roll mantle by the intermediate of a fluid film, follows the movement of the roll mantle 12 and presses the slide of the regulation device 66 by the intermediate of the spindle 67 in the same direction against the load of the spring 68. The axial length of the middle part 69 of the slide is dimensioned so that when the roll mantle 12 approaches its permitted extreme position, the slide 69,70,71 has moved into such a position that pressure medium can flow from a feed duct 19a through an annular groove 74 beyond the middle part 69 of the slide into a first flow passage 72 and, from it, further flows along a pressure duct 75 into the cavity space 61. This forms a braking pressure for the movement of the roll mantle 12, which braking pressure finally stops and halts the movement of the roll mantle 12 once it has reached its permitted extreme position. Then, the pressure ducts of the setting pressure proper, which pass to the glide-bearing members 14,14a, are preferably closed. It is an advantage of this arrangement that it permits controlled movements of the roll mantle 12 without outside control, and, moreover, it also protects the fluid films of the glide-bearing members 14,14a in the extreme positions of the roll mantle 12. The operation of the arrangement is, of course, similar when the movement of the roll mantle 12 takes place in the opposite direction.

The illustrated embodiment in FIG. 7 only shows the manner in which the movements of the roll mantle 12 are controlled and braked down. However, it is fully obvious that, besides the pressure connections shown in FIG. 7, a normal setting pressure must be fed into the cavity space 61,61a in each glide-bearing member 14,14a also in the neutral or middle position shown in FIG. 7 the setting pressure is required since the glide-bearing members 14,14a are also loaded against the inner face 12' of the roll mantle in the situation shown in the figure. As can be seen in FIG. 7, the supply of the setting pressure cannot be arranged through the feed duct 19a, because the middle part 69 of the slide completely covers the annular groove 74 and prevents the flow of the pressure medium into both of the flow passages 72,73. For the feed of the setting pressures, an additional duct that communicates with the pressure source must be formed into each frame piece 63,63a, the pressure medium that is passed through this additional duct is not passed through the regulation device 66.

Figure 8:
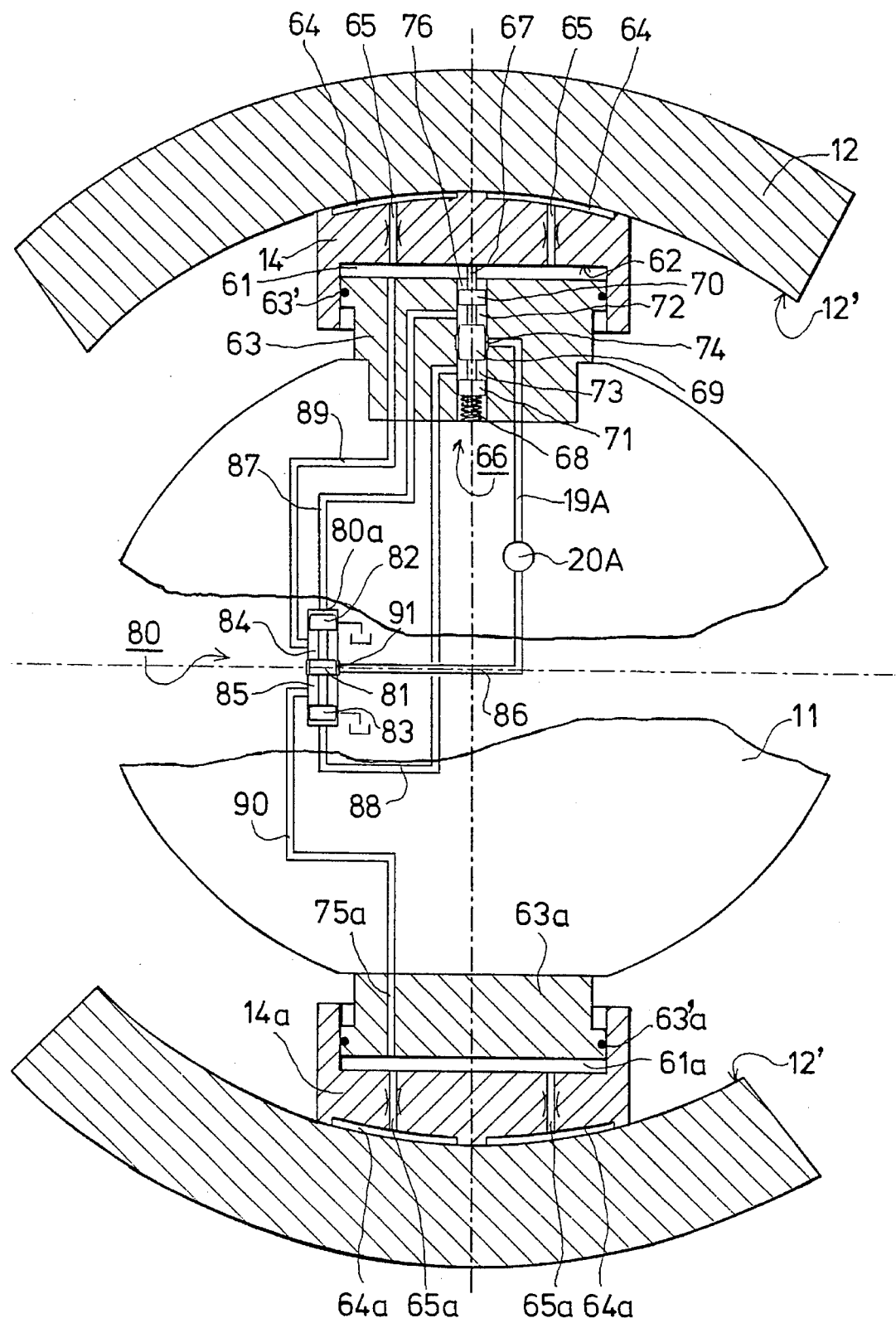
FIG. 8 is an illustration corresponding to FIG. 7 of a second embodiment of the support of the roll mantle in the direction of loading.

FIG. 8 is an illustration corresponding to FIG. 7 of a second embodiment of the control arrangement for the movements of the roll mantle 12 in a roll fitted with glide bearings in accordance with the invention. The embodiment of FIG. 8 differs from that shown in FIG. 7 in the respect that the arrangement as shown in FIG. 8 is provided with pre-control means. To begin with, a brief description will be given of the construction of the arrangement shown in FIG. 8. In the embodiment illustrated in the figure, the roll axle is denoted by reference numeral 11 and the roll mantle is denoted by reference numeral 12. In the direction of loading, the roll mantle 12 is supported by means of glide-bearing members 14,14a acting upon the inner face 12' of the roll mantle. As before, the bearing members act in opposite directions. Similarly to the embodiment of FIG. 7, the glide-bearing members 14,14a are provided with frame pieces 63,63a mounted on the roll axle 11, and which penetrate into the cavity spaces 61,61a formed in the glide-bearing members 14,14a. The sealing of the cavity spaces 61,61a is arranged by means of seals 63' 63'a in a manner similar to that described in relation to FIG. 7. Oil pockets 64,64a are formed onto the glide-bearing members 14,14a in their outer faces. The oil pockets communicate through the capillary bores 65,65a with the cavity spaces 61,61a so that, through the capillary bores 65,65a, the pressure medium has access from the cavity spaces 61,61a into the oil pockets 64,64a to form a fluid film between the inner face 12' of the roll mantle and the glide-bearing members 14,14a.

Further, in a manner similar to FIG. 7, in the embodiment of FIG. 8 the arrangement is provided with a regulation device 66, which comprises a bore 76 formed in the frame piece 63 of the first glide-bearing member 14 and into which a three-part slide 69,70,71 has been displaceably fitted. The slide is loaded, by means of a spring 68 arranged on the bottom of the bore 76 underneath the slide, toward the first glide-bearing member 14 so that the spindle 67 of the slide is supported against and contacts the bottom 62 of the cavity space. Further, similarly to FIG. 7, an annular groove 4 is formed in the bore 76. The annular groove 74 communicates with the central duct 20a through the feed duct 19a. From the central duct 20a, the pressure medium is fed to the regulation device 66.

Differing from FIG. 7, the embodiment of FIG. 8 is additionally provided with a regulation valve 80, which forms a pre-control for the regulation of the movement of the roll mantle 12. In principle, the construction of the regulation valve 80 is similar, e.g., to the regulation valve 40 shown in FIG. 4. Regulation valve 80 comprises a three-part slide 81,82,83 movable in a bore 80a, in which slide flow passages 84,85 remain between the slide parts for the pressure control. The bore 80a in the regulation valve 80 is provided with an annular groove 91 from which the regulation valve 80 communicates through a pressure-feed duct 86 with the central duct 20a. The first flow passage 72 of the regulation device 66 communicates through a pressure-control duct 87 with the bore 80a behind the first end part 82 of the three-part slide. Similarly, the second flow passage 73 of the regulation device 66 communicates through a second pressure-control duct 88 with the bore 80a of the regulation valve behind the second end part 83 of the slide. On the other hand, from the first flow passage 84 of the regulation device 80, a first pressure duct 89 passes to the cavity space 61 of the first glide-bearing member 14. Likewise, the second flow passage 85 of the regulation device communicates through a second pressure duct 90 with the pressure duct 75*a* formed in the frame piece 63*a* of the second glide-bearing member. Duct 75*a* further communicates with the cavity space 61*a*. As is the case in the embodiment shown in FIG. 7, and also in the exemplifying embodiment of FIG. 8, the arrangements related to the feeding of proper setting pressures for the glide-bearing members 14,14*a* are not shown.

The operation of the embodiment as shown in FIG. 8 is as follows. In FIG. 8, the roll mantle 12 is shown in its middle or neutral position. When the roll mantle 12 moves in either direction away from the middle position shown, for example down in FIG. 8, the regulation device 66 permits a shift of a certain extent of the roll mantle 12, for the same reason as that described in relation to FIG. 7, i.e., the distance determined by the axial length of the middle part 69 of the slide of the regulation device 66. When the roll mantle 12 approaches its extreme position, a connection is opened from the feed duct 19*a* into the first flow passage 72 and from it further, a pressure connection is opened along the first pressure-control duct 87 into the bore 80*a* behind the first end part 82 of the slide of the regulation valve 80. Then, the pressure coming from the first pressure-control duct 87 shifts the slide of the regulation valve 80 down in FIG. 8, so that the middle part 81 of the slide fully closes the connection from the pressure-feed duct 86 of the regulation valve into the second flow passage 85 of the regulation valve 80. Correspondingly, the downward movement of the middle part of the slide opens the connection into the first flow passage 84. From passage 84 the flow and the pressure coming from the central duct 20*a* through the pressure-feed duct 86 of the regulation valve have access through the first pressure duct 89 into the cavity space 61 in the first glide-bearing member. In this case, the pressure passed into cavity space 61 in the first glide-bearing member forms a braking pressure for the movement of the roll mantle 12, which pressure ultimately stops the movement of the roll mantle 12 in its extreme position. Thus, the operation of the embodiment shown in FIG. 8 is similar to that shown in FIG. 7, with the exception that, owing to the regulation valve 80, an attenuation is provided for the control of the movement of the roll mantle 12, in which case sudden vibrations and oscillations, which may occur in the embodiment of FIG. 7, are eliminated in the embodiment of FIG. 8.

Figure 9:
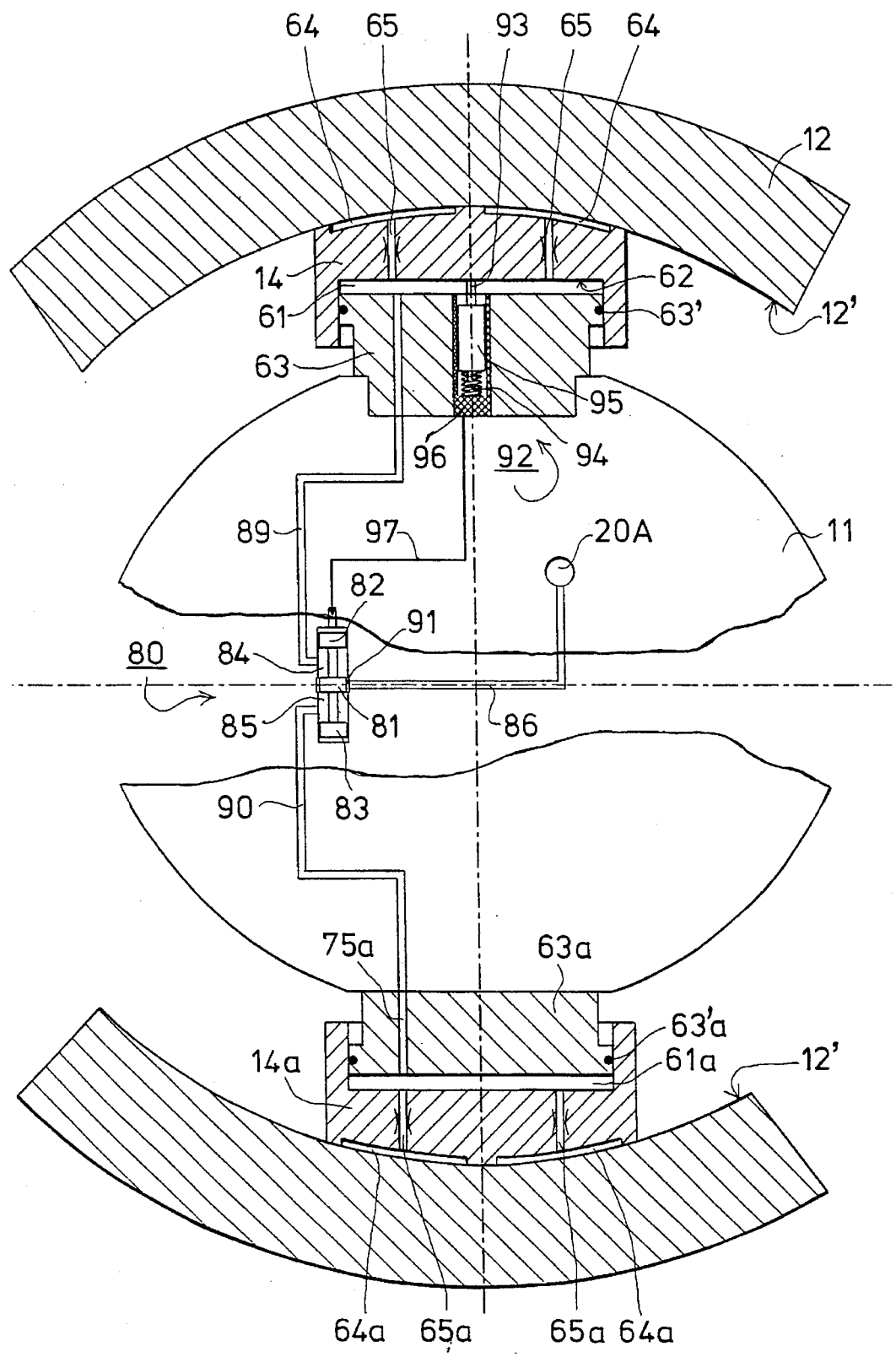
FIG. 9 is an illustration corresponding to FIGS. 7 and 8 of a third embodiment of the support of the roll mantle in the direction of loading.

FIG. 9 shows a third embodiment of the control of the movements of the roll mantle 12 in the loading direction, i.e., for example, in the case of the variable-crown roll 10 shown in FIG. 1, in the direction of the nip plane. Also in the embodiment shown in FIG. 9, the roll axle is denoted by reference numeral 11 and the roll mantle is denoted by reference numeral 12. In a manner similar to the embodiments of FIGS. 7 and 8, the roll mantle 12 is supported in relation to the axle 11 by means of glide-bearing members 14,14*a* acting in the direction of loading in opposite directions. The bearing members 14,14*a* are provided with cavity spaces 61,61*a* and with frame pieces 63,63*a* penetrating into the cavity spaces and attached to the roll axle 11. The sealing between the frame pieces 63,63*a* and the cavity spaces 61,61*a* is arranged by means of the seals 63' 63', *a* in the manner described above. Further, as described above, the glide-bearing members 14,14*a* are provided with oil pockets 64,64*a* on their outer faces. The oil pockets communicate through the capillary bores 65,65*a* with the cavity spaces 61,61*a* so that a pressure medium has access from the cavity spaces 61,61*a* through the capillary bores 65,65*a* into the oil pockets 64,64*a* and forms a fluid film between the glide-bearing members 14,14*a* and the inner face 12' of the roll mantle.

The embodiment of FIG. 9 differs from the embodiments shown in FIGS. 7 and 8 so that the arrangement is provided with a position-measurement device 92 placed inside the roll, the device 92 is, in the case of FIG. 9, arranged in connection with the first glide-bearing member 14. In the exemplifying embodiment, the position-measurement device 92 is an electromagnetically operating position-measurement device which comprises a frame 96 of the measurement device. The frame 96 is fitted into the frame piece 63 of the glide-bearing member 14 and comprises a displaceable slide 95 provided with a spindle 93. The slide 95 is loaded by means of a spring 94 so that the spindle 93 rests against, and is in contact with, the bottom surface 62 of the cavity space. Further, the arrangement in accordance with FIG. 9 is provided with a regulation valve 80 similar to that shown in FIG. 8. The movement of the slide 81,82,83 of the regulation valve is controlled electromagnetically from the position-measurement device 92 by the intermediate of an electromagnetic control connection 97. The regulation valve 80 communicates through the pressure ducts 89 and 90 with the cavity space 61,61*a* of each glide-bearing member 14,14*a*. The principle of operation of the position-measurement device 92 may also be other than electromagnetic.

The operation of the embodiment as shown in FIG. 9 is as follows. First, certain limit values are set for the movement of the slide 95 of the position-measurement device 92, so that, when the roll mantle 12 moves far enough so that the slide 95 reaches its preset limit value, which corresponds to the pre-determined extreme position of the roll mantle 12, the position-measurement device 92 gives a command to shift the slide 81,82,83 of the regulation valve 80 through the control connection 97. If the roll mantle 12 moves down in the illustration of FIG. 9, and the movement of the slide 95 reaches its preset limit value, the position-measurement device 92 gives a command to shift the slide 81,82,83 of the regulation valve 80 down in FIG. 9, in which case, the pressure and the flow of the pressure medium have access from the central duct 20*a*, through the pressure-feed duct 86 of the regulation valve. The pressure medium then flows into the first flow passage 84 of the regulation valve 80 and, from it, flows further along the first pressure duct 89 into the cavity space 61 of the first glide-bearing member 14 so as to produce a braking pressure for the movement of the roll mantle 12. In the other respects, the operation is similar to that described above in relation to FIGS. 7 and 8.

Figure 10:
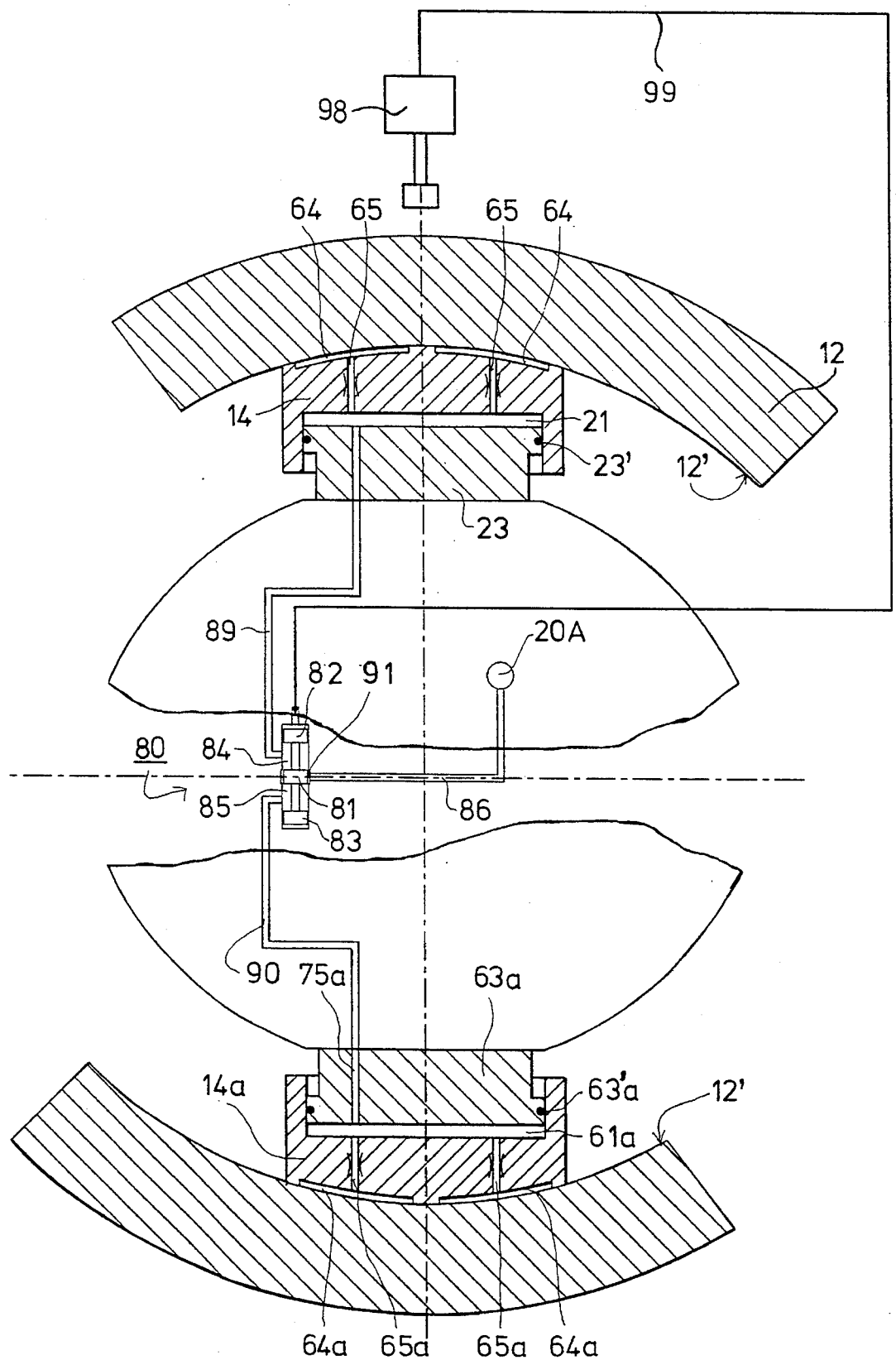
FIG. 10 is an illustration corresponding to FIGS. 7–9 of a fourth embodiment of the of support of the roll mantle in the direction of loading.

FIG. 10 shows a fourth exemplifying embodiment of the arrangement in accordance with the intention for the control of the position and the movements of the roll mantle 12 in the direction of loading, i.e., in the roll 10 as shown in FIG. 1, in the direction of the nip plane, when a roll provided with glide bearings is concerned. The embodiment shown in FIG. 10 is in the other respects similar to, and identical with, the embodiment shown in FIG. 9, with the exception that, whereas the position-measurement device 92 was, fitted inside the roll in the embodiment of FIG. 9, in FIG. 10 an embodiment is shown in which a position-measurement device 98 is placed outside the roll. With regard to its mode of operation, the position-measurement device 98 can be similar to that shown in FIG. 9, i.e., for example, such that the position-measurement device 98 measures the position of the roll mantle 12 either by means of a contact-free detector or by means of a detector that is in contact with the roll mantle 12. Depending on the position of the roll mantle 12, the device 98 gives an electromagnetic or other control signal along a control connection 99 to the regulation valve 80 so as to produce a braking pressure in the glide-bearing member 14,14a placed at the side of the loading. Since, also in the embodiment of FIG. 10, it is essential that a maximum movement of a certain magnitude must be allowed for the roll mantle 12 in both directions from the middle or neutral position shown in FIG. 10, the position-measurement device 98 is arranged to give a control signal that transfers the slide 81,82,83 of the regulation valve when the roll mantle 12 approaches its extreme position. Thus, the principle of operation is equivalent to that in the embodiment shown in FIG. 9.

In the embodiments shown in FIGS. 8, 9 and 10, it was described that the regulation valve 80 is arranged inside the roll. The regulation valve 80 may, of course, also be positioned outside the roll, the operation of the arrangement nevertheless being, similar to that described above. Further, it is a feature common of the embodiments of FIGS. 8, 9 and 10, and so also of FIG. 7, that, as was stated above, in these figures it is not illustrated how the setting pressures proper are passed to the glide-bearing members. In the embodiments shown in FIGS. 7, 8, 9 and 10, the emphasis has been exclusively on the manner in which the movements of the roll mantle 12 are controlled and in which the braking pressures are produced in the glide-bearing members 14,14a. The introduction of the setting pressures to the glide-bearing members 14,14a can be provided by conventional means.

Figure 11:
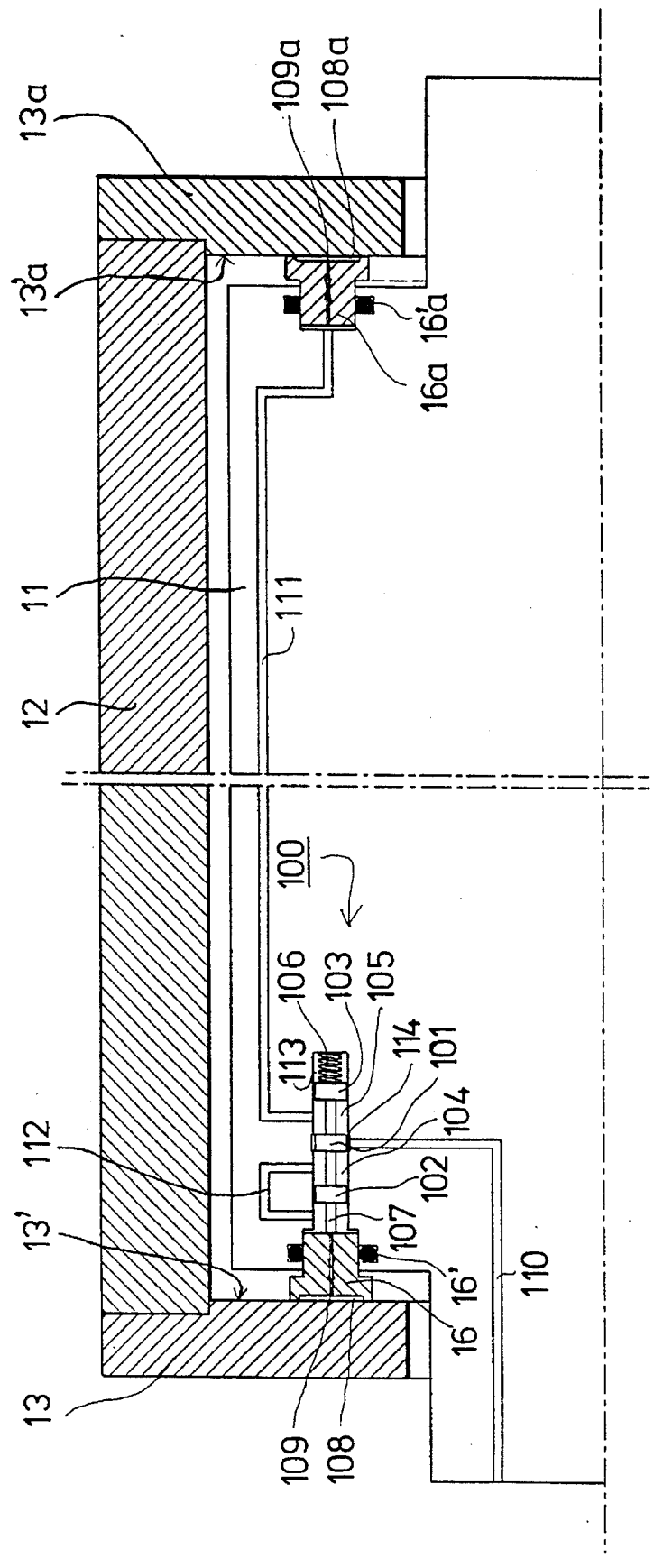
FIG. 11 is an axial and partly sectional view of the axial support of the roll mantle and of the control system for the movements of the roll mantle in the axial direction in accordance with the invention.

FIG. 11 shows a first embodiment of the axial support of the roll mantle 12 in a roll provided with glide bearings. The mode of axial support is to a great extent similar to the arrangement of support of the roll mantle 12 in the lateral direction, so that, for example, the support arrangement illustrated in FIG. 3 could be applied to the axial support of the roll mantle almost as such. In FIG. 11, the roll axle is denoted by the reference numeral 11 and the roll mantle is denoted by the reference numeral 12. The roll mantle 12 is provided with roll ends 13,13a, and axial glide-bearing members 16,16a are arranged in the interior of the roll mantle. The members 16,16a are supported against the roll axle 11, act in opposite directions, and are supported against the inner faces 13' 13'a of the roll ends The construction of the glide-bearing members 16,16a is simpler than that shown in FIG. 3, so that, in the embodiment of FIG. 11, bores have simply been formed into the roll axle 11, and the piston parts of the glide-bearing members 16,16a have been displaceably arranged in the bores. 0f course, the bores that have been formed in the axle 11 for the glide-bearing members 16,16a are provided with necessary seals 16' 16'a.

The first axial glide-bearing member 16 is connected with a regulation device which is denoted generally by reference numeral 100. The regulation device 100 comprises a slide 101,102, 103 positioned in a bore 113 formed into the roll axle 11. In the slide, the middle part 101 and the end parts 102 and 103 of the slide define flow passages 104,105 between them for the flow of a pressure medium. The three-part slide 101,102,103 of the regulation device is provided with a spindle 107, and on the bottom of the bore 113, a spring 106 is arranged underneath the slide 101,102, 103. The spring loads the spindle against the piston part of the first axial glide-bearing member 16. The glide-bearing members 16,16a are provided with oil pockets 108,108a, and capillary bores 109,109a have been formed through the glide-bearing members the bores connect the oil pockets 108,108a with the pressure medium that has been fed to below the glide-bearing members. Pressure medium has access through the capillary bores 109,109a into the oil pockets 108,108a to form a necessary fluid film between the inner faces 13' 13'a of the roll ends and the glide-bearing members 16,16a.

The regulation device 100 communicates with a pressure-medium feed duct 110 which opens into an annular groove 114 that has been formed in the bore 113 in the regulation device. The axial length of the annular groove 114 and the axial length of the middle part 101 of the three-part slide of the regulation device are arranged in such a way in relation to one another that, in the middle position shown in FIG. 11, the glide-bearing members 16,16a receive their pressure (i.e., flow of pressure medium) from the feed duct 110 through the flow passages 104,105 and through the connecting duct 111 and the pressure duct 112. The operation of the arrangement as shown in FIG. 11 is such that, when outer axial forces act upon the roll mantle 12, the slide 101,102, 103 regulates the pressure passing to the glide-bearing members 16,16a so that the outer axial forces are effectively neutralized. Thus, for example, when the roll mantle 12 moves from the middle or neutral position shown in FIG. 11 to the right, the slide 101,102,103 of the regulation device 100 also moves to the right, in which case the middle part 101 of the slide cuts off the pressure connection from the feed duct 110 to the second axial glide-bearing member 16a and, correspondingly, opens the pressure connection-into the first glide-bearing member 16. Thus, a pressure is formed underneath the first glide-bearing member 16 which shifts the roll mantle 12 back to its middle or neutral position.

With respect to an alternative and advantageous embodiment of axial support, reference is made in particular to FIG. 2A and to the related description thereof.

Figure 12:
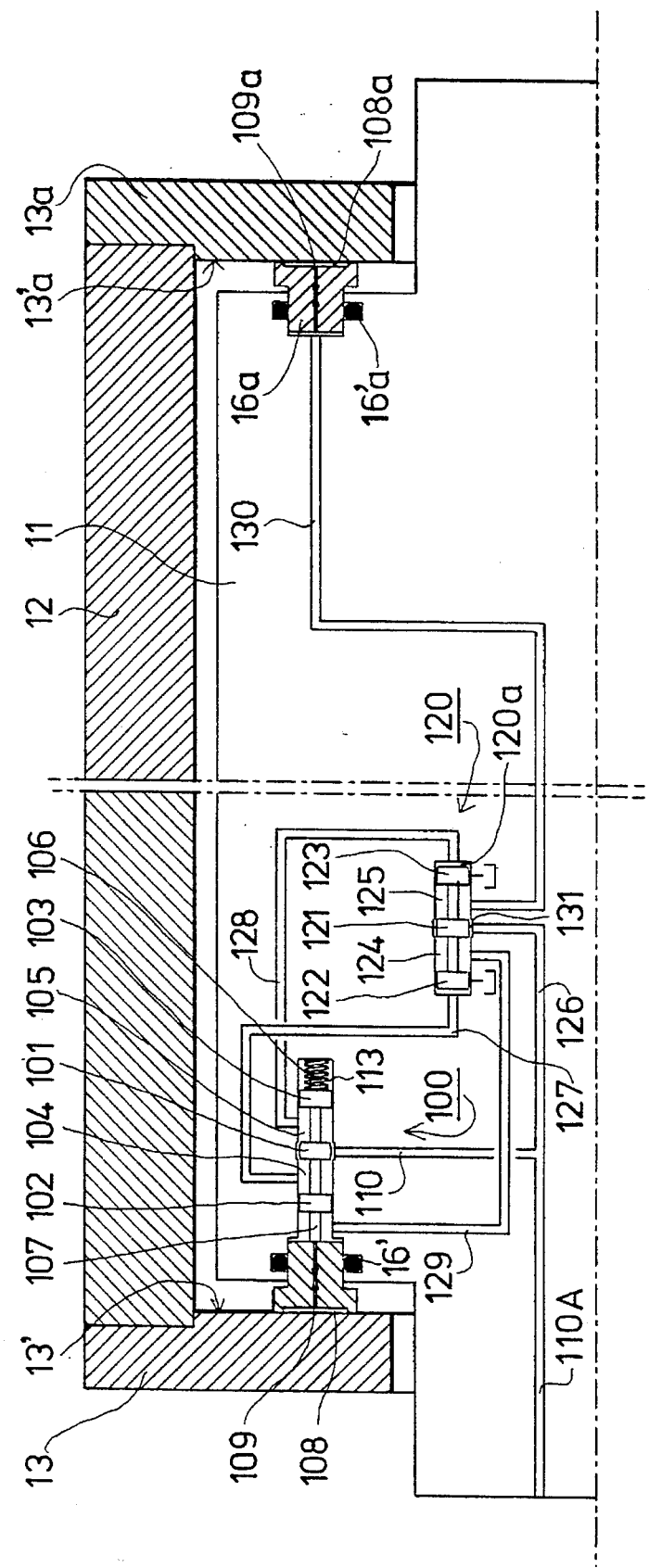
FIG. 12 is illustration corresponding to FIG. 11 of a second embodiment of axial support of the roll mantle.

FIG. 12 shows a second embodiment of the axial support of a roll mantle in a roll provided with glide bearings. The embodiment of FIG. 12 differs from that shown in FIG. 11 in the respect that the arrangement of FIG. 12 is additionally provided with a regulation valve 120 which provides a pre-control for the control of the movements of the roll mantle 12. The arrangement of FIG. 12 is to a large extent similar to the arrangement illustrated in FIG. 4 for the transverse support of the roll mantle 12. The roll itself and the axial glide-bearing members 16,16a are similar to those shown in FIG. 11, and further, the regulation device 100 is similar to that described in relation to FIG. 11, so that in these respects, reference is made to the description related to FIG. 11.

The mode of connection of the regulation device 100 itself differs from that shown in FIG. 11 and, as was already stated above, the embodiment of FIG. 12 is additionally provided with a regulation valve 120 which provides a pre-control. The regulation device 120 comprises a bore 120a which has been formed in the frame of the regulation device and in which a three-part slide 121,122, 123 is placed. In the bore 120a in the regulation valve 120, an annular groove 131 is formed through which the regulation valve 120 communicates with a pressure-feed duct 126 of the regulation valve. Duct 126 further communicates with the main duct 110A, through which the pressure medium is also fed into the feed duct 110 and from feed duct 110 further to the regulation device 100. Flow passages 124,125 are defined by the middle part 121 and the end parts 122 and 123 of the three-part slide of the regulation valve 120 and communicate through pressure ducts 129,130 with the opposite glide-bearing members 16,16a. Further, the flow passages 104,105 defined by the middle part 101 and the end parts 102,103 of the three-part slide communicate through pressure-control ducts 127,128 with the rear side of the opposite end parts 122,123 of the slide of the regulation valve 120.

The operation of the arrangement as shown in FIG. 12 is as follows. When an outside axial force is applied to the roll, e.g., in the illustration of FIG. 12 from the left, the roll mantle 12 and the first axial glide-bearing member 16 move to the right in FIG. 12. In this case, the slide of the regulation device 100 also moves to the right so that the middle part 101 of the slide closes the second flow passage 105 of the regulation device 100 and opens the first flow passage 104. The pressure via the flow of the pressure medium fed to the regulation device 100 along the feed duct 110 can act, through the first flow passage 104, upon the first pressure-control duct and flow it behind the first end part 122 of the regulation valve 120. The pressure shifts the slide 121,122, 123 of the regulation valve 120 so that the middle part 121 of the slide closes the flow of the pressure-medium to the second glide-bearing member 16a. Correspondingly, the shift of the slide opens the flow through the first pressure duct 129 to the area underneath the first axial glide-bearing member 16. Thus, a higher pressure is effective underneath the first glide-bearing member 16 than underneath the second glide-bearing member 16a. This higher pressure shifts the roll mantle 12 in the axial direction to its middle and neutral position. By means of the arrangement, the outside axial forces acting upon the roll mantle 12 are neutralized. It is a difference of the arrangement of FIG. 12 in comparison to FIG. 11 that the regulation valve 120 provides the arrangement of FIG. 12 with attenuation, in which case the corrective movements for adjusting the position of the roll mantle 12 are quite soft, and substantial axial oscillation movement do not occur.

Figure 13:
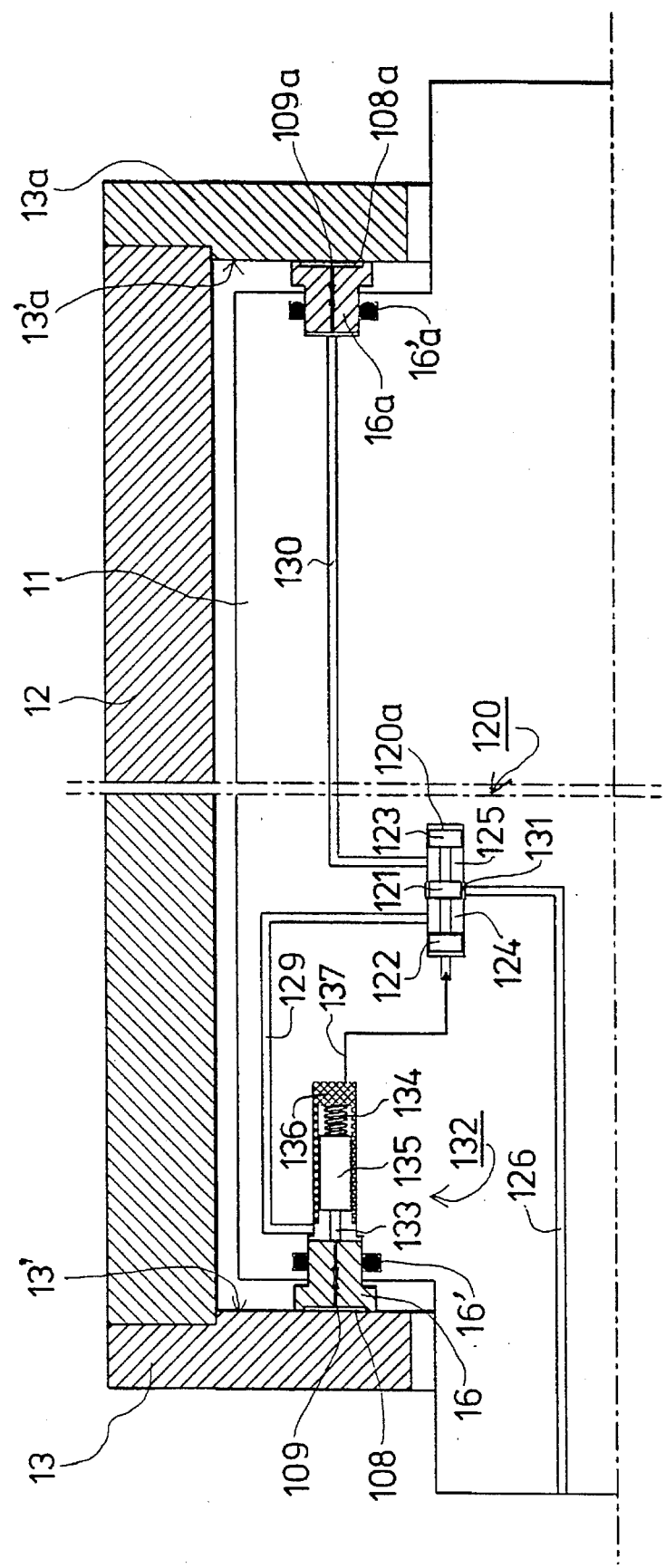
FIG. 13 is illustration corresponding to FIGS. 11 and 12 of a third embodiment of the axial support of the roll mantle.

The embodiment shown in FIG. 13 differs from those shown in FIGS. 11 and 12 in the respect that the axial glide-bearing members 16,16a are not provided with a hydraulic regulation device 100 corresponding to FIGS. 11 and 12. Rather, in the embodiment of FIG. 13, the roll is provided with a position-measurement device 132. In the illustration of FIG. 13, the position-measurement device 132 is positioned behind the first axial glide-bearing member 16. The position-measurement device 132 comprises a frame 136 of the measurement device, into which a slide 135 has been displaceably arranged. The slide is provided with a spindle 133. A spring 134 is mounted in the frame 136 of the measurement device underneath the slide 13. The spring 134 loads the slide 135 so that the spindle 133 is supported against the first glide-bearing member 16. In this manner, the slide 135 of the position-measurement device moves along with the movements of the first axial glide-bearing member 16. The embodiment of FIG. 13 is additionally provided with a regulation valve 120 similar to that provided in the arrangement of FIG. 12. The regulation valve 120 distributes the flow of the pressure medium, and thus the pressure provided thereby, coming from the pressure-feed duct 126 through the pressure ducts 129 and 130 to the opposite glide-bearing members 16,16a.

The embodiment of FIG. 13 operates so that, when an outer axial force acts upon the roll mantle 12, e.g., from the left in FIG. 13, this outside force shifts the roll mantle 12 to the right in FIG. 13. In this case, the first glide-bearing member 16 and the slide 135 of the position-measurement device 132 also move to the right in a corresponding manner. As shown in the figure, the position-measurement device 132 operates, e.g., electromagnetically, and it is connected to the regulation valve 120 by the intermediate of an electromagnetic control connection 137. The principle of operation can also be other than electromagnetic. When the slide 135 of the position-measurement device 132 moves to the right, a control signal is transmitted along the control connection 137 to the regulation valve 120 to shift the slide 121,122,123 of the regulation valve to the right. The middle part 121 of the slide of the regulation valve closes the pressure and flow connection to the second axial glide-bearing member 16a and, in a corresponding manner, opens the connection exclusively to the first axial glide-bearing member 16. In this manner, a higher pressure is formed underneath the first glide-bearing member 16, compared with the pressure present underneath the second axial glide-bearing member 16a. This higher pressure acts against the outside force and shifts the roll mantle 12 back to its middle or neutral position.

Figure 14:
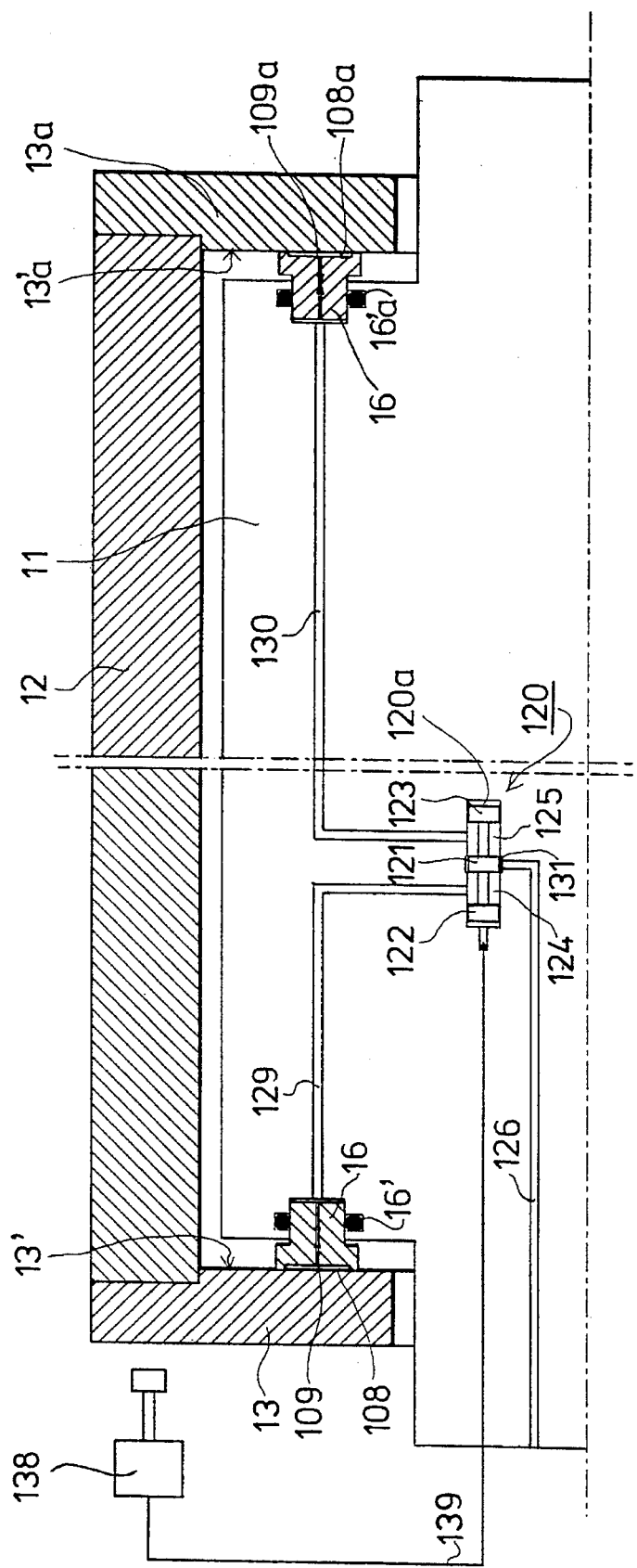
FIG. 14 is an illustration corresponding to FIGS. 11–13 of a fourth embodiment of the axial support of the roll mantle.

The embodiment of FIG. 14 is identical with that shown in FIG. 13, with the exception that in this embodiment, a position-measurement device 138 is arranged outside the roll. In a manner corresponding to FIG. 6, the position-measurement device 138 is provided either with a contact-free detector or with a detector that is in contact with the outer surface of the roll end 13. When outside axial forces act upon the roll mantle 12, the position-measurement device gives a control command, corresponding to the axial position of the roll mantle 12, by the intermediate of a control connection 139, to the regulation valve 120, whose construction and operation are identical with the regulation valve described in relation to FIG. 13. The operation of the embodiment as shown in FIG. 14 is fully similar to that described in relation to FIG. 13.

In FIGS. 12, 13 and 14, it was described that the regulation valve 120 is arranged inside the roll. The regulation valve 120 can, of course, also be installed outside the roll, while the operation of the arrangement does not differ from what has been described above. In FIGS. 11–14, the axial glide-bearing members 16,16a are shown schematically, and in respect of their construction they may differ from those shown in the figures, while their operation is, nevertheless, similar to that described above. In the above description, the sealing means in the roll have not been dealt with either, which sealing means can be accomplished in any known way whatsoever.

The examples provided above are not meant to be exclusive. Many other variations of the present invention would be obvious to those skilled in the art, and are contemplated to be within the scope of the appended claims.

We claim:

1. A method for arranging glide bearing apparatus in a tubular roll mantle of a roll for a paper machine, wherein the roll mantle is supported on a stationary roll axle by glide-bearing members acting upon the roll mantle or upon ends of the roll under hydraulic pressure provided by a pressure medium, comprising the steps of:

arranging at least a pair of said glide-bearing members to support the roll by acting in opposite radial directions and/or in opposite axial directions, and upon a first loading force being applied to a side of the roll which is higher than a second loading force being applied to an opposite side of the roll, adjusting the hydraulic pressure acting on one of said pair of glide-bearing members situated at said side of the roll having said higher loading to a level higher than the hydraulic pressure acting on the other of said pair of glide-bearing members to counteract the forces causing said higher loading.

2. The method of claim 1, further comprising the steps of providing a regulation device to regulate the hydraulic pressure acting on said pair of glide-bearing members, and controlling the regulation of the hydraulic pressure acting on said pair of glide-bearing members relative to movement of the roll mantle.

3. The method of claim 1, further comprising the steps of providing a regulation device to regulate the hydraulic pressure acting on said pair of glide-bearing members by controlling the distribution of pressure medium to said pair of glide-bearing members, and controlling the regulation of the hydraulic pressure acting on said pair of glide-bearing members relative to the movement of one of said pair of glide-bearing members.

4. The method of claim 1, further comprising the steps of providing a first regulation device to regulate the hydraulic pressure acting on said pair of glide-bearing members by controlling the distribution of pressure medium to said pair of glide-bearing members, and arranging a second regulation device in connection with the roll mantle, said second regulation device controlling said first regulation device relative to the movement of the roll mantle.

5. The method of claim 1, further comprising the steps of providing a regulation device to regulate the hydraulic pressure acting on said pair of glide-bearing members by controlling the distribution of pressure medium to said pair of glide-bearing members, providing a position-measurement device to measure the position of the roll mantle and generate a control command based thereon, coupling said position-measurement device to said regulation device, and controlling said regulation device in relation to said control command to distribute the pressure medium in a specific proportion to said pair of glide-bearing members.

6. The method of claim 5, wherein said position-measurement device is arranged in an interior of the roll in connection with one of said pair of glide-bearing members.

7. The method of claim 5, wherein said position-measurement device is arranged exterior to the roll and measures movement of an outer surface of the roll.

8. The method of claim 1, further comprising the steps of arranging hydraulic loading members to support the roll mantle in a main loading plane, and supporting the roll mantle in a direction transverse to the main loading plane.

9. The method of claim 1, wherein said pair of said glide-bearing members are arranged to support the roll by acting in opposite radial directions.

10. The method of claim 1, wherein said pair of said glide-bearing members are arranged to support the roll in opposite axial directions.

11. The method of claim 1, wherein said at least a pair of said glide-bearing members comprises a first pair of glide bearing members arranged to support the roll in opposite radial directions and a second pair of glide bearing members arranged to support the roll in opposite axial directions.

12. A method for arranging glide bearing in a tubular roll mantle of a roll for a paper machine, wherein the roll mantle is supported on a stationary roll axle by glide-bearing members acting upon the roll mantle under hydraulic pressure provided by a pressure medium, and the roll is loaded radially in a main loading plane, comprising the steps of:

arranging at least a pair of said glide-bearing members to support the roll in opposite radial directions in said main loading plane and to allow the roll mantle to move a preset radial distance to an extreme position, and adjusting the hydraulic pressure acting on said pair of glide-bearing members to brake the movement of the roll mantle as the roll mantle approaches said extreme position and to stop the movement of the roll mantle when the roll mantle is in said extreme position.

13. The method of claim 12, further comprising the steps of providing a regulation device to regulate the hydraulic pressure acting on said pair of glide-bearing members, and controlling the regulation of the hydraulic pressures of said pair of glide-bearing members relative to movement of the roll mantle.

14. The method of claim 12, further comprising the steps of providing a regulation device to regulate the hydraulic pressure acting on said pair of glide-bearing members by controlling the distribution of pressure medium to said pair of glide-bearing members, and controlling the regulation of the hydraulic pressures of said pair of glide-bearing members relative to the movement of one of said pair of glide-bearing members.

15. The method of claim 12, further comprising the steps of providing a first regulation device to regulate the hydraulic pressure acting on said pair of glide-bearing members by controlling the distribution of pressure medium to said pair of glide-bearing members, and arranging a second regulation device in connection with the roll mantle, said second regulation device controlling said first regulation device relative to the movement of the roll mantle.

16. The method of claim 12, further comprising the steps of providing a regulation device to regulate the hydraulic pressure acting on said pair of glide-bearing members by controlling the distribution of pressure medium to said pair of glide-bearing members, providing a position-measurement device to measure the position of the roll mantle and generate a control command based thereon, coupling said position-measurement device to said regulation device, and controlling said regulation device in relation to said control command to distribute the hydraulic pressure medium in a specific proportion to said pair of glide-bearing members.

17. The method of claim 16, wherein said position-measurement device is arranged in an interior of the roll in connection with one of said pair of glide-bearing members.

18. The method of claim 16, wherein said position-measurement device is arranged exterior to the roll and measures movement of an outer surface of the roll.

19. The method of claim 12, further comprising the steps of arranging hydraulic loading members to support the roll mantle in a main loading plane, and supporting the roll mantle in a direction transverse to the main loading plane.

20. The method of claim 12, further comprising the step of ceasing the flow of pressure medium to said pair of glide-bearing members when the roll mantle reaches said extreme position.

* * * * *